US010841422B2

(12) United States Patent
Wang et al.

(10) Patent No.: US 10,841,422 B2
(45) Date of Patent: Nov. 17, 2020

(54) MULTI-SIM CALL MANAGEMENT METHOD AND APPARATUS, MANAGED DEVICE, AND SERVER

(71) Applicant: Huawei Technologies Co., Ltd., Shenzhen (CN)

(72) Inventors: Sishan Wang, Beijing (CN); Xinmiao Chang, Beijing (CN); Qiang Yi, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/624,133

(22) PCT Filed: Oct. 25, 2017

(86) PCT No.: PCT/CN2017/107715
§ 371 (c)(1),
(2) Date: Dec. 18, 2019

(87) PCT Pub. No.: WO2019/000738
PCT Pub. Date: Jan. 3, 2019

(65) Prior Publication Data
US 2020/0137229 A1    Apr. 30, 2020

(30) Foreign Application Priority Data

Jun. 26, 2017   (CN) .......................... 2017 1 0494840

(51) Int. Cl.
*H04M 3/436* (2006.01)
*H04W 4/60* (2018.01)
(Continued)

(52) U.S. Cl.
CPC ........... *H04M 3/436* (2013.01); *H04M 1/575* (2013.01); *H04M 3/4217* (2013.01);
(Continued)

(58) Field of Classification Search
None
See application file for complete search history.

(56) References Cited

U.S. PATENT DOCUMENTS 9,801,158 B1 * 10/2017 Yuan ..................... H04M 3/465
2004/0161085 A1    8/2004 Horne
(Continued)

FOREIGN PATENT DOCUMENTS

CN             1787580 A      6/2006
CN           101119532 A      2/2008
(Continued)

*Primary Examiner* — German Viana Di Prisco
(74) *Attorney, Agent, or Firm* — Conely Rose, P.C.

(57) ABSTRACT

A method applicable to a multi-subscriber identity module (SIM) call management process includes parsing, by a managed device, an incoming call to obtain call information, determining a communications circuit corresponding to a called identifier, and when the managed device has performed an incoming call shielding setting on the communications circuit in response to a remote management instruction sent by an entitlement server (ES), skipping responding, by the managed device, to an incoming call event, or receiving, by the server, a remote management instruction from the ES, and deleting or freezing routing information corresponding to an identifier in response to the remote management instruction such that a communications circuit corresponding to the identifier in the managed device is unable to respond to an incoming call event.

20 Claims, 15 Drawing Sheets

(51) Int. Cl.
*H04M 1/57* (2006.01)
*H04M 3/42* (2006.01)
*H04W 4/16* (2009.01)
*H04W 8/18* (2009.01)
*H04W 8/26* (2009.01)

(52) U.S. Cl.
CPC ... *H04M 3/42059* (2013.01); *H04M 3/42153* (2013.01); *H04M 3/42246* (2013.01); *H04W 4/16* (2013.01); *H04W 4/60* (2018.02); *H04W 8/183* (2013.01); *H04W 8/26* (2013.01)

(56) References Cited

U.S. PATENT DOCUMENTS

| | | |
|---|---|---|
| 2007/0036098 A1 | 2/2007 | Jain et al. |
| 2013/0346610 A1 | 12/2013 | Liu |
| 2014/0024353 A1 | 1/2014 | Baek et al. |
| 2015/0350129 A1* | 12/2015 | Cary et al. |
| 2016/0337521 A1* | 11/2016 | Kim .................... H04B 1/385 |
| 2017/0195861 A1 | 7/2017 | Cho et al. |
| 2019/0069162 A1* | 2/2019 | Lindheimer ........ H04L 63/0876 |

FOREIGN PATENT DOCUMENTS

| | | |
|---|---|---|
| CN | 101267474 A | 9/2008 |
| CN | 102104652 A | 6/2011 |
| CN | 102469425 A | 5/2012 |
| CN | 102651860 A | 8/2012 |
| CN | 102761853 A | 10/2012 |
| CN | 105682066 A | 6/2016 |
| CN | 105975847 A | 9/2016 |
| CN | 106717113 A | 5/2017 |
| EP | 1206156 A2 | 5/2002 |

* cited by examiner

MULTI-SIM CALL MANAGEMENT METHOD AND APPARATUS, MANAGED DEVICE, AND SERVER

CROSS-REFERENCE TO RELATED APPLICATIONS

This application is a U.S. National Stage application of International Patent Application No. PCT/CN2017/107715 filed on Oct. 25, 2017, which claims priority to Chinese Patent Application No. 201710494840.1 filed on Jun. 26, 2017. Both of the aforementioned applications are hereby incorporated by reference in their entireties.

TECHNICAL FIELD

This application relates to the field of embedded subscriber identity module (embedded Subscriber Identity Module, eSIM) technologies, and in particular, to a multi-SIM (multi-SIM) call management method and apparatus.

BACKGROUND

Development of eSIM technologies brings a multi-SIM service. A plurality of terminals in the multi-SIM service may be considered as a plurality of terminals that have different international mobile subscriber identities (International Mobile Subscriber Identification Number, IMSI), but have a same mobile station international ISDN number (Mobile Subscriber International ISDN/PSTN number, MSISDN).

The plurality of terminals usually include one management device and at least one managed device. The management device may activate a multi-SIM service for each managed device. To implement the multi-SIM service, the management device needs to load, in an eSIM of the managed device, a profile (profile) associated with the management device. When a calling terminal initiates a call to a terminal corresponding to an MSISDN, because the management device and the managed device have the same MSISDN, both the management device and the managed device may receive an incoming call, in other words, the management device and the managed device ring at the same time. In this case, a user can only answer the call by using one of the plurality of terminals, to be specific, a terminal that first responds to the incoming call event serves as a called terminal to establish the call with the calling terminal.

However, during actual use of the management device and the managed device, when the management device and the managed device are within use scopes of different users, although a user needs to establish the call by using the management device, the management device or the managed device can establish the call with the calling terminal provided that the device first answers the incoming call. In other words, when the managed device first answers the call, the user cannot establish the call with the calling terminal by using the management device, and the call is answered by mistake.

SUMMARY

Embodiments of the present invention provide a multi-SIM call management method and apparatus, a managed device, and a server, to resolve a problem that a call is answered by mistake.

To resolve the foregoing problem, the embodiments of the present invention provide the following solutions:

According to a first aspect, an embodiment of the present invention provides a multi-SIM call management method. The method includes: parsing, by a managed device, an incoming call to obtain call information, and determining a communications subunit corresponding to a called identifier; and skipping responding, by the managed device, to an incoming call event if the managed device has performed an incoming call shielding setting on the communications subunit in response to a remote management instruction sent by an entitlement server ES. The entitlement server is responsible for providing functions such as activation and remote management of a multi-SIM service. It should be noted that after performing the incoming call shielding setting on the communications subunit once, the managed device shields, based on the completed incoming call shielding setting provided that the managed device does not disable the incoming call shielding setting, each incoming call event that meets a shielding requirement and that is received by the managed device later. The call information includes the called identifier that points to a profile. The communications subunit is configured to implement, on the managed device, a communication function corresponding to the profile, and the communication function includes at least answering an incoming call that points to the profile. The remote management instruction includes an identifier of a managed profile in the managed device. In the prior art, a management device carried by a user cannot establish a call with a calling terminal because the incoming call event is first responded to by using the managed device. Consequently, the call is answered by mistake. In this embodiment of the present invention compared with the prior art, the management device serves as an initiator of a management operation to initiate a request message to the managed device by using the ES, and then the managed device completes the incoming call shielding setting. In this way, after the calling terminal initiates the call, because the managed device has completed the shielding setting, the managed device shields an incoming call that meets a shielding condition, so that the user cannot sense the incoming call event, and the user can process the incoming call event only by using the management device. In addition, the incoming call shielding setting implemented in this embodiment of the present invention is only for an incoming call whose called number is a designated number, and does not affect communication of the user during a data service, a calling service, or another service. For example, after the user selects the multi-SIM service, the management device and the managed device serve as a called party whose number is 133XXXXXXXX. According to a remote management method in this embodiment of the present invention, the user dials 133XXXXXXXX by using a calling terminal, and the managed device does not respond to the incoming call. The managed device may not respond to the incoming call by performing automatic shielding or by disabling reception of the incoming call on the managed device side.

It should be noted that for at least two associated devices, a device may determine, through detection or the like, whether wearing authentication on the device succeeds. In addition, the device may further determine whether the device is in a motion state. Then, the device may feed back a detection result to another device associated with the device. The another device may determine, by comparing a state of the another device with the received detection result of the device, which device is the management device and which device is the managed device, and then feed back a determining result of identities of the devices to the device. In this way, the at least two associated devices may perform corresponding functions based on their own identities. For example, a device identified as the management device may manage another managed device to perform an incoming call shielding setting, and a device identified as the managed device may comply with a remote management instruction initiated by the management device to implement the incoming call shielding setting.

Certainly, the device may also pre-store a condition for distinguishing between the management device and the managed device; determine priorities of the another device and the device by determining a condition met by the device and receiving a condition that is met by the another device and that is sent by the another device; determine which device is the management device and which device or devices are the managed devices; and notify the another device of the identities of the devices, so that the management device manages the managed device to complete the incoming call shielding setting. It should be noted that a manner used to determine the identities of the management device and the managed device is not limited to the foregoing enumerated case, and may further include another manner used to distinguish between management priorities. This is not limited herein. In a possible design, before the managed device does not respond to the incoming call event, the managed device receives the remote management instruction sent by the ES, determines a communications subunit corresponding to the identifier of the managed profile, and performs an incoming call shielding setting on the communications subunit corresponding to the identifier of the managed profile in response to the remote management instruction. In view of this, if the user attempts to shield all incoming calls that need to be processed by the communications subunit corresponding to the identifier of the managed profile, the user needs to perform the shielding setting in advance according to the remote management instruction sent by the ES.

In a possible design, the performing, by the managed device, an incoming call shielding setting on the communications subunit corresponding to the identifier of the managed profile includes: performing, by the managed device by using a call screening technology such as a call screening service (call screening service) in an Android system, the incoming call shielding setting on the communications subunit corresponding to the identifier of the managed profile; or setting, by the managed device, an empty call answering whitelist for the communications subunit corresponding to the identifier of the managed profile, to shield a call initiated by a mobile station international ISDN number MSISDN that is used as a calling number and that does not belong to the call answering whitelist; or adding a designated identifier to the communications subunit by using the incoming call shielding setting, so that during a call, if the communications subunit detects that the communications subunit has the designated identifier, the communications subunit does not respond to the incoming call event. The foregoing several enumerated available shielding settings and corresponding shielding operation means are merely used as a possible implementation. This is not limited herein.

In a possible design, the skipping responding to an incoming call event includes: rejecting the incoming call event or ignoring the incoming call event. In other words, the shielding operation implemented in this embodiment of the present invention brings a result that the managed device does not respond to the incoming call.

In a possible design, the called identifier includes one of a temporary mobile subscriber identity TMSI, an international mobile subscriber identity IMSI, and a mobile station international ISDN number MSISDN.

In a possible design, after the managed device determines the communications subunit corresponding to the called identifier, if the incoming call shielding setting has not been performed on the communications subunit, the managed device prompts the user to respond to the incoming call event, to be specific, processes the incoming call based on a currently normal incoming call processing procedure.

According to a second aspect, an embodiment of the present invention provides a multi-SIM call management method. The method includes: establishing, by a management device, a connection to a managed device; determining, by the management device when determining that the connection is broken, whether the management device is in a motion state; and managing, by the management device if the management device is in the motion state, the managed device to shield an incoming call.

In a possible design, the managing, by the management device if the management device is in the motion state, the managed device to shield an incoming call includes: managing, by the management device if the management device is in the motion state and the motion state remains for preset duration, the managed device to shield the incoming call. It should be noted that in this case, it is considered, by default, that the management device and the managed device have already known their own identities. Certainly, the devices may determine their own identities through querying and the like. For example, when a management relationship is being established between the management device and the managed device, a user may set a device as the management device and set one or more other devices as the managed devices. In this way, when determining that the connection between the management device and the managed device is broken and the management device is in the motion state, the management device directly triggers the managed device to perform the incoming call shielding setting.

In a possible design, the managing, by the management device, the managed device to shield the incoming call includes: sending, by the management device, a remote management instruction to the managed device, where the remote management instruction includes an identifier of a managed profile in the managed device; receiving, by the managed device, the remote management instruction, and determining a communications subunit corresponding to the identifier of the managed profile; and performing, by the managed device, an incoming call shielding setting on the communications subunit in response to the remote management instruction.

In a possible design, after the performing an incoming call shielding setting on the communications subunit, the method includes: parsing, by the managed device, an incoming call to obtain call information where the call information includes a called identifier; skipping responding, by the managed device, to an incoming call event if the managed device has performed an incoming call shielding setting on a communications subunit corresponding to the called identifier; parsing, by the management device, the incoming call to obtain the call information; and responding, by the management device, to the incoming call event if the management device has not performed the incoming call shielding setting on the communications subunit corresponding to the called identifier.

According to a third aspect, an embodiment of the present invention provides a multi-SIM call management method.

The method includes: receiving, by a server, a remote management instruction sent by an entitlement server ES; and deleting or freezing routing information corresponding to an identifier of a managed profile in response to the remote management instruction. In this way, the routing information of a managed device cannot be found, no call is made to the managed device, and no call is answered on the managed device by mistake. The routing information is used to address a called party, and the remote management instruction includes the identifier of the managed profile in the managed device. It should be noted that for the deleted routing information, after receiving a routing query request, the server cannot find the deleted routing information, in other words, the server cannot feed back the deleted routing information. In this embodiment of the present invention, the communications service server may ensure, by temporarily freezing the routing information, that after a calling terminal initiates a call, the managed device cannot sense the incoming call because the routing information of the managed device is frozen. Alternatively, the server activates a supplementary service of call barring for the managed profile, to be specific, limits a call service when the managed device serves as the called party. It should be noted that the routing information of the managed device cannot be found ultimately in a communications network due to the foregoing two enumerated implementations. After the calling terminal initiates the call, because the communications network includes only routing information corresponding to a management device, the managed device responds to no call.

In a possible design, after the server deletes or freezes the routing information corresponding to the identifier in response to the remote management instruction, if the server receives a routing query request and finds the frozen routing information corresponding to the identifier in response to the routing query request, the server does not feed back the frozen routing information corresponding to the identifier.

According to a fourth aspect, an embodiment of the present invention provides a multi-SIM call management method. The method includes: establishing, by a management device, a connection to a managed device; determining, by the management device when determining that the connection is broken, whether the management device is in a motion state; and managing, by the management device if the management device is in the motion state, a server to shield an incoming call.

In a possible design, the managing, by the management device if the management device is in the motion state, a server to shield an incoming call includes: managing, by the management device if the management device is in the motion state and the motion state remains for preset duration, the server to shield the incoming call.

In a possible design, the managing, by the management device, a server to shield an incoming call includes: sending, by the management device, a remote management instruction to the server, where the remote management instruction includes an identifier of a managed profile in the managed device; and receiving, by the server, the remote management instruction, and deleting or freezing routing information corresponding to the identifier in response to the remote management instruction, so that a communications subunit corresponding to the identifier in the managed device cannot respond to an incoming call event.

In a possible design, after the deleting or freezing routing information corresponding to the identifier, the method includes: parsing, by the management device, an incoming call to obtain call information, where the call information includes a called identifier; responding, by the management device, to the incoming call event if the management device has not performed an incoming call shielding setting on a communications subunit corresponding to the called identifier; and skipping responding, by the managed device, to the incoming call event if the managed device has performed the incoming call shielding setting on the communications subunit corresponding to the called identifier.

According to a fifth aspect, an embodiment of the present invention provides a multi-SIM call management apparatus. The apparatus is applied to a managed device, and may implement a function implemented in the foregoing method embodiment. The function may be implemented by hardware, or may be implemented by hardware by executing corresponding software. The hardware or the software includes one or more modules corresponding to the foregoing function.

According to a sixth aspect, an embodiment of the present invention provides a multi-SIM call management apparatus. The apparatus is applied to a server, and may implement a function implemented in the foregoing method embodiment. The function may be implemented by hardware, or may be implemented by hardware by executing corresponding software. The hardware or the software includes one or more modules corresponding to the foregoing function.

According to a seventh aspect, an embodiment of the present invention provides a managed device. A structure of the managed device includes a processor and a transceiver. The processor is configured to support the managed device in performing a corresponding function in the foregoing method. The transceiver is configured to support communication between the managed device and another device such as a server. The managed device may further include a memory. The memory coupled to the processor is configured to store a program instruction and data that are necessary for the managed device.

According to an eighth aspect, an embodiment of the present invention provides a server. A structure of the server includes a processor and a communications interface. The processor is configured to support the server in performing a corresponding function in the foregoing method. The communications interface is configured to support communication between the server and another device such as a managed device. The server may further include a memory. The memory coupled to the processor is configured to store a program instruction and data that are necessary for the server.

According to a ninth aspect, an embodiment of the present invention provides a multi-SIM call management system. The system includes: sending, by a management device, a remote management instruction to a managed device by using an entitlement server ES; receiving, by the managed device, the remote management instruction, determining a communications subunit corresponding to an identifier of a managed profile, and performing an incoming call shielding setting on the communications subunit corresponding to the identifier of the managed profile in response to the remote management instruction, where the remote management instruction includes the identifier of the managed profile in the managed device; when receiving an incoming call subsequently, parsing, by the managed device, the incoming call to obtain call information; and skipping responding, by the managed device, to an incoming call event if the managed device has performed an incoming call shielding setting on a communications subunit corresponding to a called identifier in the call information.

In a possible design, the system further includes: parsing, by the management device, the incoming call to obtain the call information; and responding, by the management device, to the incoming call event if the management device has not performed the incoming call shielding setting on the communications subunit corresponding to the called identifier.

According to a tenth aspect, an embodiment of the present invention provides a multi-SIM call management system. The system includes: sending, by a management device, a remote management instruction to a server by using an entitlement server ES; and receiving, by the server, the remote management instruction, and deleting or freezing routing information corresponding to an identifier, so that a communications subunit corresponding to the identifier in a managed device cannot respond to an incoming call event, where the remote management instruction includes the identifier of a managed profile in the managed device.

In a possible design, the system further includes: parsing, by the management device, an incoming call to obtain call information; and responding, by the management device, to the incoming call event if the management device has not performed an incoming call shielding setting on a communications subunit corresponding to a called identifier in the call information.

According to an eleventh aspect, an embodiment of the present invention provides a computer program product, the computer program product includes software code, and the software code is used to perform the method in any one of the first aspect and the possible designs of the first aspect or in any one of the second aspect and the possible designs of the second aspect.

According to a twelfth aspect, an embodiment of the present invention provides a computer program product, the computer program product includes software code, and the software code is used to perform the method in any one of the third aspect and the possible designs of the third aspect or in any one of the fourth aspect and the possible designs of the fourth aspect.

According to a thirteenth aspect, an embodiment of the present invention provides a computer storage medium, including an instruction. When the instruction runs on an electronic device, the electronic device is enabled to perform the method in any one of the first aspect and the possible designs of the first aspect or in any one of the second aspect and the possible designs of the second aspect.

According to a fourteenth aspect, an embodiment of the present invention provides a computer storage medium, including an instruction. When the instruction runs on an electronic device, the electronic device is enabled to perform the method in any one of the third aspect and the possible designs of the third aspect or in any one of the fourth aspect and the possible designs of the fourth aspect.

DESCRIPTION OF EMBODIMENTS

Figure 1:
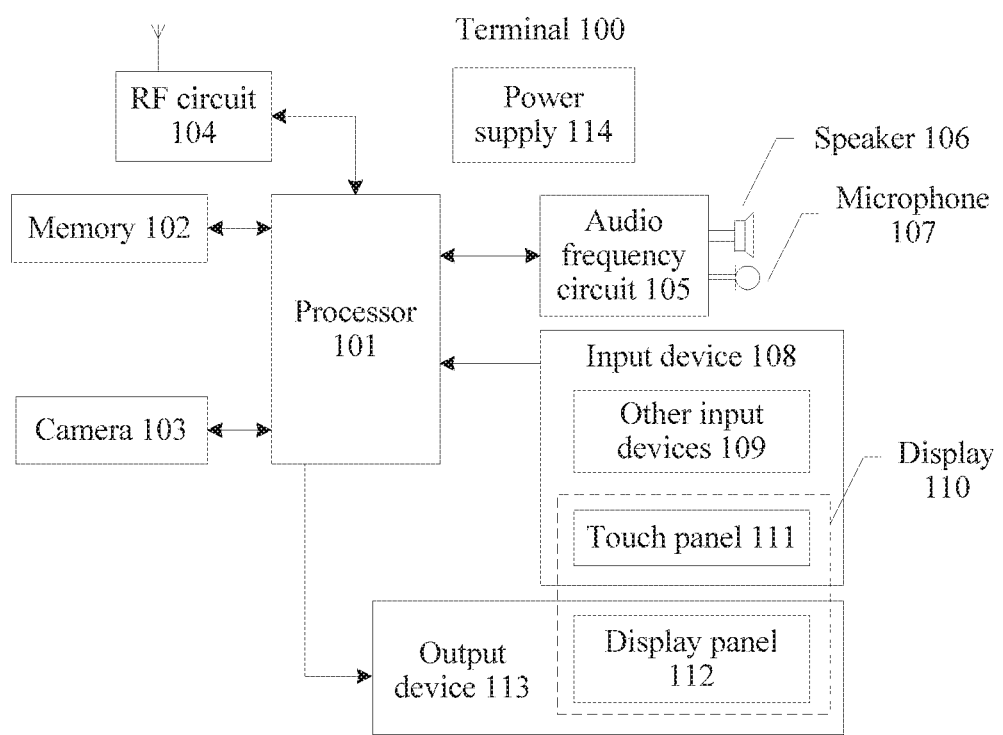
FIG. 1 is a schematic structural diagram of a terminal according to an embodiment of the present invention.

The following describes the technical solutions in the embodiments of the present invention with reference to the accompanying drawings in the embodiments of the present invention.

The embodiments of the present invention are applicable to a multi-SIM application scenario. To be specific, based on eSIM technologies, two or more terminals can share a same number, or a plurality of terminals have a same MSISDN or a same phone number. The same number is corresponding to different profiles on different terminals. For example, information such as an IMSI and a key is different. The profiles corresponding to the same number on the different terminals essentially subscribe to a same operator specific service. For example, operator specific services such as data traffic and call service duration are the same and shared between terminals.

In the embodiments of the present invention, a plurality of terminals in the multi-SIM include a management device and a managed device. The management device may not only activate a multi-SIM service for each managed device, but also manage another terminal, for example, perform an incoming call event shielding setting mentioned below in the embodiments of the present invention. Generally, a terminal expected by a user to establish a call with a calling terminal is considered as the management device, and a terminal that has an MSISDN same as the management device and an IMSI different from the management device is considered as the managed device.

For example, in scenario 1, the management device may be a portable mobile phone, and the managed device may be a non-portable tablet computer (Tablet Personal Computer, Tablet PC). When a user leaves the managed device at home for family member use, and carries the management device out, if there is a call, a family member is likely to first answer the call by using the tablet computer at home, and the call is established between the calling terminal and the tablet computer serving as the managed device. In other words, the user cannot answer the call by using the mobile phone carried by the user.

For another example, in scenario 2, the management device may be a watch worn by a user, and the managed device may be a mobile phone. The user doing outdoor sports is likely to wear only the watch, and leave the mobile phone at home. If there is a call, because the user doing sports may not be able to notice, in time, call information prompted on the watch, a family member answers the call by mistake by using the mobile phone, and the call is established between the mobile phone at home and the calling terminal. In other words, the user cannot answer the call by using the watch worn by the user.

For another example, in scenario 3, the management device may be a portable mobile phone, and the managed device may be an in-vehicle device. After a user lends a car including the in-vehicle device to another person for driving, if there is a call, the another person is likely to answer the call by using the in-vehicle device because of a habitual answering operation of the another person or because the user does not answer the call for a long time, and the call is established between the in-vehicle device and the calling terminal. In other words, the user cannot answer the call by using the mobile phone carried by the user.

In view of this, in many scenarios, use of the multi-SIM service causes a problem that a call is answered by mistake. Currently, to resolve the problem, a managed profile may be deactivated on the managed device. For example, a profile is set to a disable state (disable state) to ensure that the user cannot answer a call by using the managed device after the calling terminal initiates the call. Because the profile is essential for implementing a communication capability, deactivation of the profile means that all services cannot be used, and another communication problem may also occur. For example, because the managed profile is deactivated, the managed device cannot normally use a data function, and cannot serve as a calling terminal to initiate a call to another terminal.

Therefore, to better resolve the problem that a call is answered by mistake due to the multi-SIM service, the embodiments of the present invention provide a multi-SIM call management method, to limit a capability of the managed device to respond to the call on the managed device or a server on a network side, in other words, manage the capability of the managed device to respond to the call. The server may be a server configured to implement a communications service, such as a home location register (Home Location Register, HLR) or a home subscriber server (Home Subscriber Server, HSS).

The embodiments of the present invention can be applied to a terminal. The terminal may be a management device or a managed device, and the terminal may include a device such as a notebook computer, a smartphone, or a wristband. The terminal is provided with at least a display, an input device, and a processor. A terminal 100 is used as an example. As shown in FIG. 1, the terminal 100 includes components such as a processor 101, a memory 102, a camera 103, an RF circuit 104, an audio frequency circuit 105, a speaker 106, a microphone 107, an input device 108, other input devices 109, a display 110, a touch panel 111, a display panel 112, an output device 113, and a power supply 114. The display 110 includes at least the touch panel 111 serving as an input device and the display panel 112 serving as an output device. It should be noted that a structure of the terminal shown in FIG. 1 constitutes no limitation on the terminal, and the terminal may include more or fewer components than those shown in the figure, or combine some components, or split some components, or have different component arrangements. This is not limited herein.

The following describes each constituent component of the terminal 100 in detail with reference to FIG. 1.

The radio frequency (Radio Frequency, RF) circuit 104 may be configured to: receive and send a signal in an information receiving/transmitting process or a call process. For example, if the terminal 100 is a mobile phone, the terminal 100 may receive, by using the RF circuit 104, downlink information sent by a base station, and then send the downlink information to the processor 101 for processing; and in addition, send related uplink data to the base station. The RF circuit usually includes but is not limited to an antenna, at least one amplifier, a transceiver, a coupler, a low noise amplifier (Low Noise Amplifier, LNA), a duplexer, and the like. In addition, the RF circuit 104 may further communicate with a network and another device through wireless communication. The wireless communication may use any communications standard or protocol, including but not limited to the Global System for Mobile Communications (Global System for Mobile communications, GSM), a general packet radio service (General Packet Radio Service, GPRS), Code Division Multiple Access (Code Division Multiple Access, CDMA), Wideband Code Division Multiple Access (Wideband Code Division Multiple Access, WCDMA), Long Term Evolution (Long Term Evolution, LTE), an email, a short message service (Short Message Service, SMS), and the like.

The memory 102 may be configured to store a software program and a module, and the processor 101 performs various function applications of the terminal 100 and data processing by running the software program and the module that are stored in the memory 101. The memory 101 may mainly include a program storage area and a data storage area. The program storage area may store an operating system, an application program required by at least one function (such as a sound playing function or an image playing function), and the like. The data storage area may store data (such as audio data or video data) created based on use of the terminal 100, and the like. In addition, the memory 101 may include a high-speed random access memory, or may include a nonvolatile memory, such as at least one magnetic disk storage device, a flash device, or another volatile solid-state storage device.

The other input devices 109 may be configured to: receive input number or character information, and generate key signal input related to user setting and function control of the terminal 100. Specifically, the other input devices 109 may include but are not limited to one or more of a physical keyboard, a function key (such as a volume control key or an on/off key), a trackball, a mouse, a joystick, an optical mouse (the optical mouse is a touch-sensitive surface that does not display a visual output, or an extension of a touch-sensitive surface formed by a touchscreen), and the like. The other input devices 109 may further include a sensor built in the terminal 100, such as a gravity sensor or an acceleration sensor, and the terminal 100 may further use a parameter detected by the sensor as input data.

The display 110 may be configured to display information entered by a user or information provided for a user, and various menus of the terminal 100, and may further receive user input. In addition, the display panel 112 may be configured by using a liquid crystal display (Liquid Crystal Display, LCD), an organic light-emitting diode (Organic Light-Emitting Diode, OLED), or the like. The touch panel 111, also referred to as a touchscreen, a touch-sensitive screen, or the like, may collect a touch or non-touch operation (for example, an operation performed by the user on the touch panel 111 or near the touch panel 111 by using any proper object or accessory, such as a finger or a stylus, or may include a motion sensing operation, where the operation includes an operation type such as a single-point control operation or a multipoint control operation) performed by the user on or near the touch panel 111, and drive a corresponding connection apparatus based on a preset program. It should be noted that the touch panel 111 may further include two parts: a touch detection apparatus and a touch controller. The touch detection apparatus detects a touch orientation and gesture of the user, detects a signal brought by a touch operation, and sends the signal to the touch controller. The touch controller receives touch information from the touch detection apparatus, converts the touch information into information that can be processed by the processor 101, and then sends the information to the processor 101, and can further receive and execute a command sent by the processor 101. In addition, the touch panel 111 may be implemented in a plurality of types, such as a resistive type, a capacitive type, an infrared ray, and a surface acoustic wave, or the touch panel 111 may be implemented by using any technology developed in the future. Generally, the touch panel 111 may cover the display panel 112. The user may perform, based on content displayed on the display panel 112 (the displayed content includes but is not limited to a soft keyboard, a virtual mouse, a virtual key, an icon, and the like), an operation on or near the touch panel 111 that covers the display panel 112. After detecting the operation on or near the touch panel 111, the touch panel 111 sends the operation to the processor 101 to determine user input, and then the processor 101 provides corresponding visual output on the display panel 112 based on the user input. In FIG. 1, the touch panel 111 and the display panel 112 serve as two independent components to implement input and output functions of the terminal 100. However, in some embodiments the touch panel 111 and the display panel 112 may be integrated to implement the input and output functions of the terminal 100.

The RF circuit 104, the speaker 106, and the microphone 107 may provide an audio interface between the user and the terminal 100. The audio frequency circuit 105 may convert received audio data into a signal, and transmit the signal to the speaker 106, and the speaker 106 converts the signal into a voice signal for output. In addition, the microphone 107 may convert a collected voice signal into a signal, and the audio frequency circuit 105 receives the signal, converts the signal into audio data, and then outputs the audio data to the RF circuit 104, to send the audio data to a device such as another terminal, or output the audio data to the memory 102, so that the processor 101 performs further processing with reference to content stored in the memory 102. In addition, the camera 103 may collect an image frame in real time and send the image frame to the processor 101 for processing, and store a processed result in the memory 102 and/or display a processed result to the user by using the display panel 112.

The processor 101 is a control center of the terminal 100, is connected to each part of the entire terminal 100 by using various interfaces and lines, and performs various functions of the terminal 100 and data processing by running or executing the software program and/or the module that are/is stored in the memory 102 and invoking data stored in the memory 102, to perform overall monitoring on the terminal 100. In addition, the processor 101 may further manage a communications subunit, for example, configure the communications subunit. It should be noted that the processor 101 may include one or more processing units. An application processor and a modem processor may be integrated into the processor 101. The application processor mainly processes an operating system, a user interface (User Interface, UI), an application program, and the like, and the modem processor mainly processes wireless communication. It may be understood that the modem processor may not be integrated into the processor 101.

The terminal 100 may further include the power supply 114 (for example, a battery) that supplies power to each component. In this embodiment of the present invention, the power supply 114 may be logically connected to the processor 101 by using a power management system, to manage functions such as charging, discharging, and power consumption by using the power management system.

In addition, there are still components not shown in FIG. 1. For example, the terminal 100 may further include a Bluetooth module, a Near Field Communication (Near Field Communication, NFC) module, a Wireless Fidelity (Wireless Fidelity. Wi-Fi) module, a global positioning system (global positioning system, GPS) module, a speaker, an accelerometer, a gyroscope, and the like. Details are not described herein. The Bluetooth module may be configured to establish, within a specific distance (within a distance specified by the Bluetooth Protocol), a Bluetooth connection and mutual communication between the mobile phone and another device that supports a Bluetooth function. The NFC module may be configured to establish an NFC connection and mutual communication between the mobile phone and another device that supports NFC communication. The terminal 100 may establish a Wi-Fi connection by using the Wi-Fi module and perform data transmission.

Figure 2:
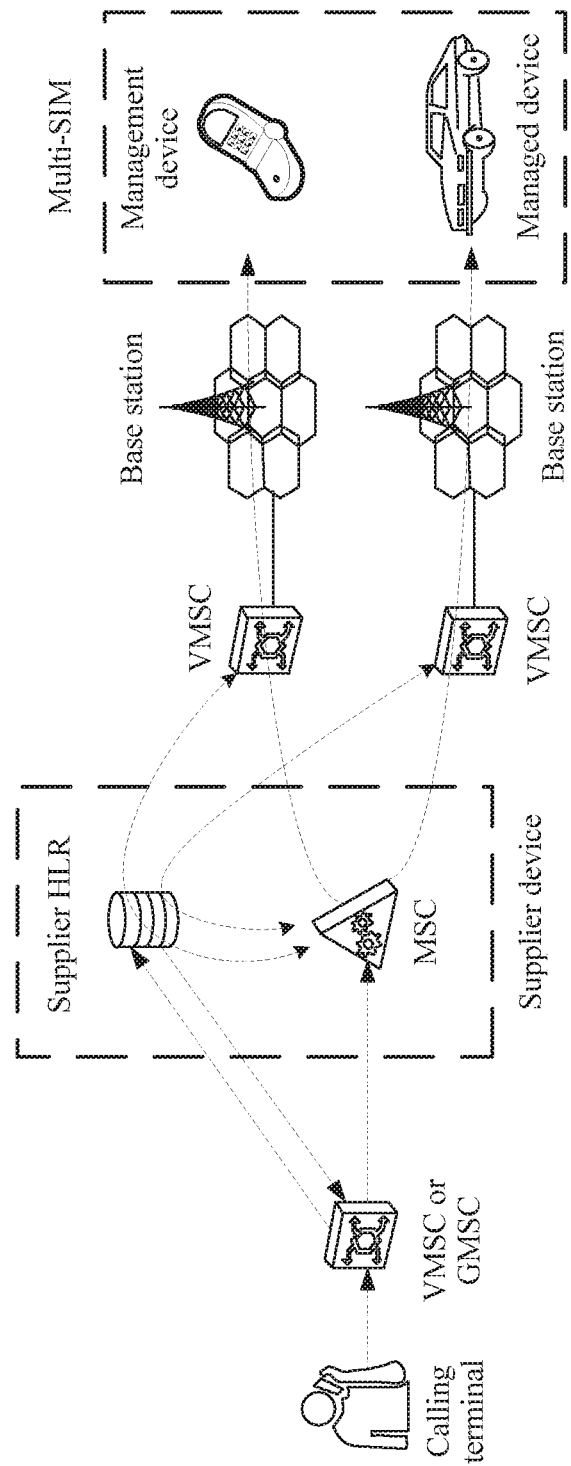
FIG. 2 is a schematic structural diagram of a communications network system according to an embodiment of the present invention.

FIG. 2 shows a communications network system according to an embodiment of the present invention. A management device and a managed device may be implemented as the terminal shown in FIG. 1. In this embodiment of the present invention, an example in which the management device is a mobile phone and the managed device is an in-vehicle device is used for description. A calling terminal initiates a call by using a visited mobile switching center (Visited Mobile-services Switching Centre, VMSC) or a gateway mobile switching center (Gateway Mobile Switching Center, GMSC). Then a mobile network operator (Mobile Network Operator, MNO) obtains routing information of the management device and the managed device from a supplier HLR (or a supplier HSS), and simultaneously initiates, based on the obtained routing information, an incoming call in a simultaneous ringing mode to devices corresponding to a plurality of pieces of routing information.

Figure 3:
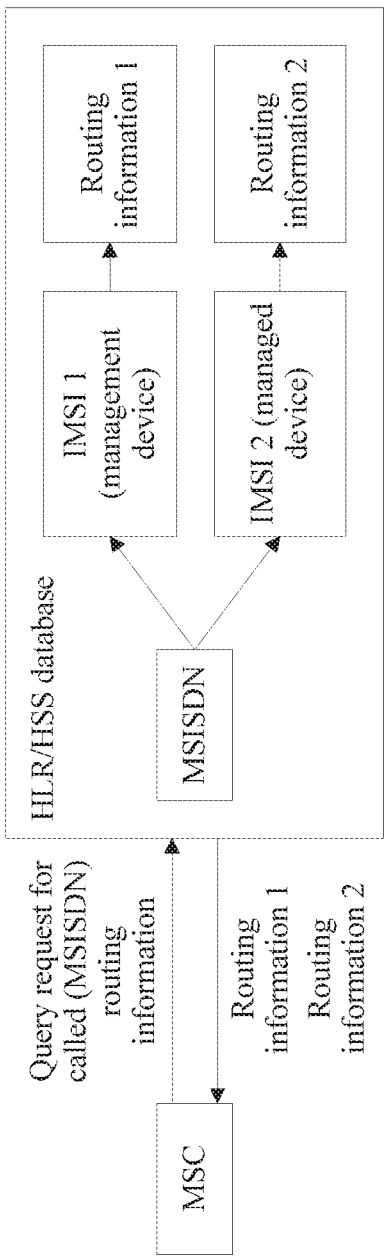
FIG. 3 is a schematic diagram of a process of obtaining routing information by an MSC according to an embodiment of the present invention.

An implementation process in which a mobile switching center (Mobile Switching Center, MSC) obtains the routing information is shown in FIG. 3. An HLR/HSS database may be set in the supplier HLR. The MSC initiates a query request for called routing information to the HLR/HSS, and finds a plurality of pieces of routing information corresponding to an MSISDN from the HLR/HSS database, for example, routing information 1 and routing information 2. The routing information 1 is routing information corresponding to a management device IMSI 1, and the routing information 2 is routing information corresponding to a managed device IMSI 2. Then, the HLR/HSS feeds back the route information 1 and the routing information 2 to the MSC.

Figure 4:
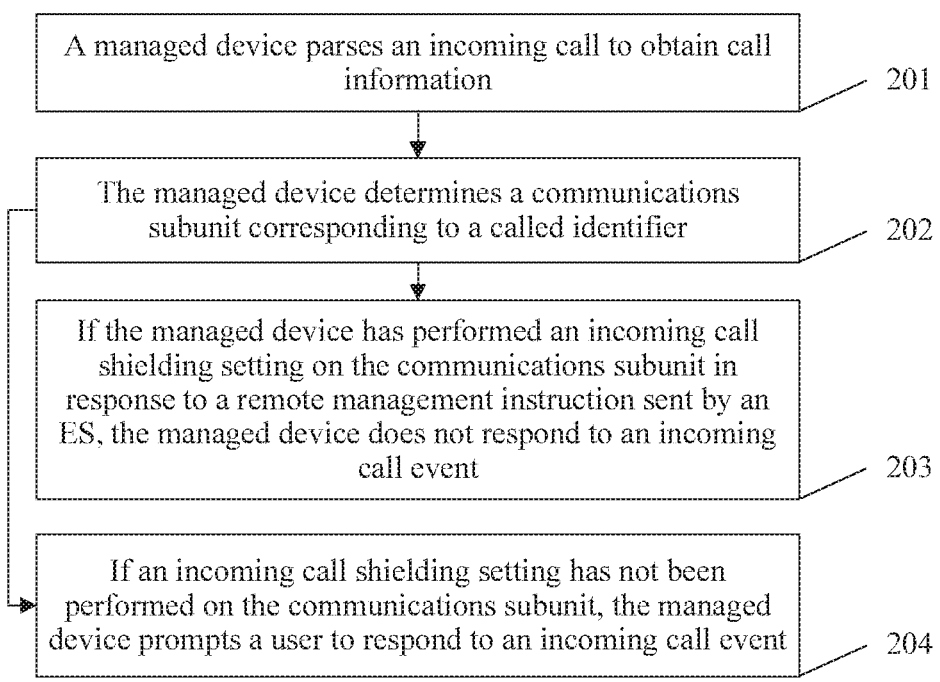
FIG. 4 is a flowchart of a multi-SIM call management method according to an embodiment of the present invention.

An embodiment of the present invention provides a multi-SIM call management method. As shown in FIG. 4, the method includes at least steps 201 to 203. In this embodiment of the present invention, the method may further include step 204.

Step 201: A managed device parses an incoming call to obtain call information.

The call information includes a called identifier. In this embodiment of the present invention, the called identifier may include but is not limited to one of a temporary mobile subscriber identity (Temporary Mobile Subscriber Identity, TMSI), an IMSI, and an MSISDN.

After the managed device receives an incoming call, the managed device directly shields an incoming call that meets a shielding condition. The shielding condition indicates that an incoming call shielding setting has been performed on a communications subunit corresponding to a profile pointed at by the called identifier. In other words, the managed device can sense an incoming call from a calling terminal. However, after sensing the incoming call, the managed device does not prompt, through voice, display, or the like, a user to answer the call. From a perspective of user sensing, the user does not sense the incoming call that meets the shielding condition.

Step 202: The managed device determines a communications subunit corresponding to a called identifier.

The communications subunit is configured to implement, on the managed device, a communication function corresponding to a profile, and the communication function includes at least answering an incoming call that points to the profile.

Step 203: If the managed device has performed an incoming call shielding setting on the communications subunit in response to a remote management instruction sent by an entitlement server (Entitlement Server, ES), the managed device does not respond to an incoming call event.

The remote management instruction includes an identifier of a managed profile in the managed device. The skipping responding to an incoming call event includes: rejecting the incoming call event or ignoring the incoming call event.

In this embodiment of the present invention, the managed device determines, based on the identifier that is of the managed profile and that is carried in the management instruction, whether the incoming call shielding setting needs to be performed on the corresponding communications subunit. When the managed device subsequently receives an incoming call, the managed device then determines whether the incoming call meets the shielding condition to determine whether the incoming call needs to be responded to. To be specific, if a called identifier included in a subsequently received incoming call event is corresponding to the identifier of the managed profile, the managed device can determine not to respond to the incoming call event.

It should be noted that the remote management instruction may further carry a management service identifier, so that the managed device triggers the incoming call shielding setting after receiving the remote management instruction and identifying the management service identifier. The management service identifier is used to indicate that the remote management instruction is an instruction used to trigger an incoming call shielding setting on a communications subunit corresponding to a designated profile. After receiving the management instruction, the managed device may verify validity of the management instruction, and after verification of the management instruction succeeds, or after determining that the management instruction can be executed, the managed device performs the incoming call shielding setting on the corresponding communications subunit based on the identifier of the managed profile, in other words, performs the shielding setting on the incoming call that points to the managed profile.

Step 204: If an incoming call shielding setting has not been performed on the communications subunit, the managed device prompts a user to respond to an incoming call event.

It should be noted that for at least two associated devices, a device may determine, through detection or the like, whether wearing authentication on the device succeeds. In addition, the device may further determine whether the device is in a motion state. Then, the device may feed back a detection result to another device associated with the device. The another device may determine, by comparing a state of the another device with the received detection result of the device, which device is the management device and which device is the managed device, and then feed back a determining result of identities of the devices to the device. In this way, the at least two associated devices may perform corresponding functions based on their own identities. For example, a device identified as the management device may manage another managed device to perform an incoming call shielding setting, and a device identified as the managed device may comply with a remote management instruction initiated by the management device to implement the incoming call shielding setting. Certainly, the device may also pre-store a condition for distinguishing between the management device and the managed device; determine priorities of the another device and the device by determining a condition met by the device and receiving a condition that is met by the another device and that is sent by the another device; determine which device is the management device and which device or devices are the managed devices; and notify the another device of the identities of the devices, so that the management device manages the managed device to complete the incoming call shielding setting. It should be noted that a manner used to determine the identities of the management device and the managed device is not limited to the foregoing enumerated case, and may further include another manner used to distinguish between management priorities. For example, the user may further preset, based on a behavioral habit of the user, the foregoing preset condition used to distinguish between the identities of the devices. Specific content of the preset condition is not limited herein. A purpose of setting the preset condition is to determine, from the at least two associated devices, the only one management device configured to manage another device, and simultaneously determine the managed device managed by the management device.

If the managed device sends a management instruction that carries a managed device parameter, and after receiving the management instruction, a peer device determines, based on the managed device parameter carried in the management instruction, a device that sends the management instruction is the managed device, and simultaneously determines, based on a peer device parameter, that the peer device is the management device, the peer device performs the incoming call shielding setting on the managed device, and returns a response to the managed device. In view of this, a process of performing the incoming call shielding setting may not only be triggered by both parties through interaction, but also be triggered by one party in a form of a request.

A device may send, to another peer device by using the ES, a remote management instruction that carries a device parameter. After receiving the remote management instruction, the another peer device determines an identity of the peer device based on the device parameter carried in the remote management instruction, with reference to a device parameter of the peer device that receives the remote management instruction. If the peer device determines that the peer device is the managed device in this case, the peer device responds to the remote management instruction, to be specific, the peer device performs the incoming call shielding setting and sends a response message to the device. If the peer device determines that the peer device should serve as the management device in this case, the peer device does not respond to the remote management instruction. Optionally, the peer device serves as the management device to initiate a remote management procedure for the device.

Alternatively, after determining that identity confirmation needs to be performed, a device sends an identity query/confirmation request to the ES. In this case, the ES obtains a state of each device, determines an identity of each device, and then returns a determining result of each device to each device. It should be noted that each device may receive only the determining result of the device, and perform the incoming call shielding setting in cooperation with another device based on the identity indicated by the determining result. Certainly, each device may alternatively receive the determining results of all devices, determine the identity of the device and an identity or identities of one or more other devices associated with the device, and complete the incoming call shielding setting.

In this embodiment of the present invention, a call answering priority of terminals may be preset on a terminal, so that the terminal subsequently determines a device identity of the terminal by exchanging data with another terminal. For example, based on the call answering priority that is set, a mobile phone in a motion state has a higher priority than a wearable device that is in a motion state and on which wearing authentication succeeds, the wearable device has a higher priority than a mobile phone in a still state, and the mobile phone in the still state has a higher priority than another device.

In the prior art, the management device cannot establish a call with a calling terminal because the user first answers the call by using the managed device. Consequently, the call is answered by mistake. In this embodiment of the present invention compared with the prior art, the management device serves as an initiator of a management operation to initiate the remote management instruction to the managed device by using the ES, and then the managed device performs the shielding setting on the incoming call that meets the shielding condition. In this way, after the calling terminal initiates the call, because the managed device has completed the shielding setting, the user can answer the call only by using the management device. In addition, the shielding operation is implemented in this embodiment of the present invention only when a called subscriber number is a designated call. To be specific, communication of the user during a data service or another service is not affected, but selective shielding is performed only on the service of an incoming call, and the incoming call mentioned herein is an incoming call that uses the designated number as the called subscriber number.

For example, during actual use of the management device and the managed device, when the management device and the managed device are within use scopes of different users, if a user needs to establish a call by using the management device, only the management device can establish the call with the calling terminal after the management device or the managed device completes the incoming call shielding setting. It should be noted that the managed device does not respond to an incoming call event only, but may perform service data or a service other than the service of responding to the incoming call event.

Figure 5:
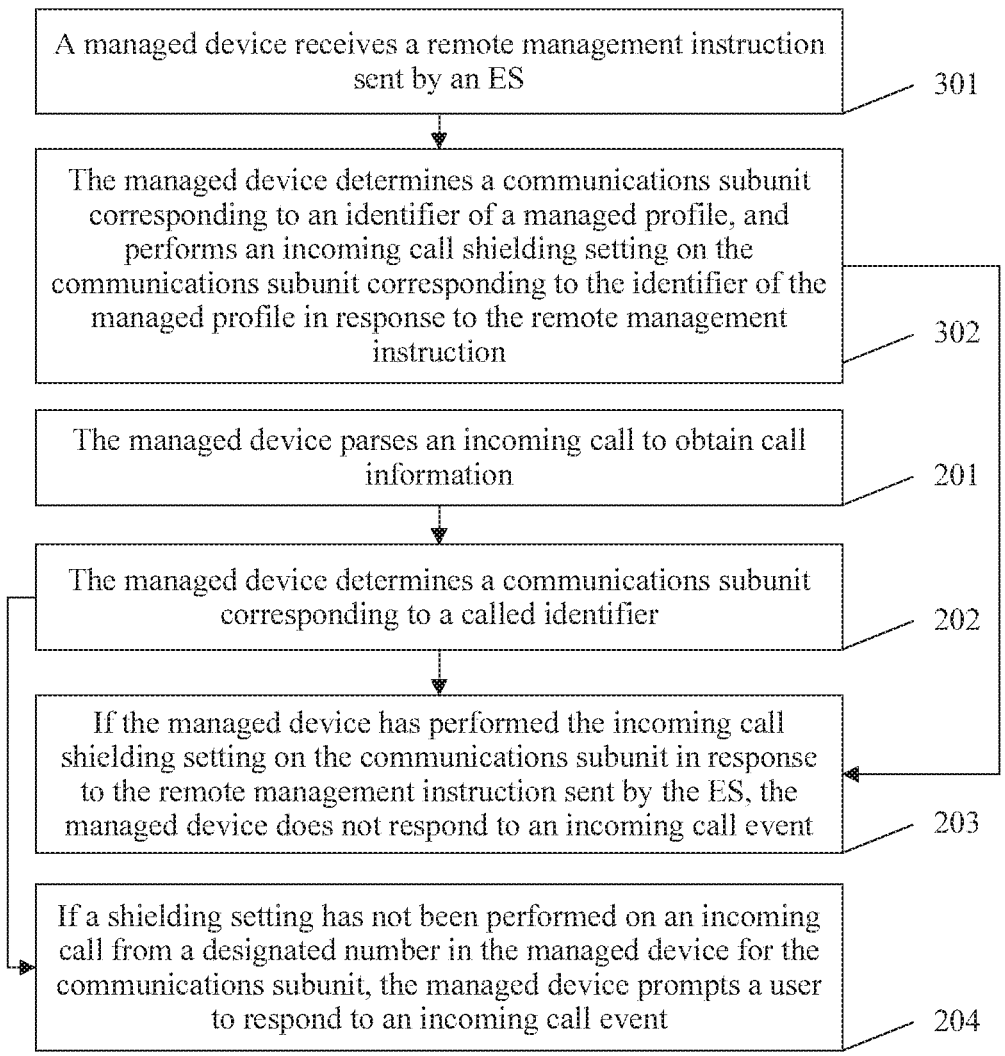
FIG. 5 is a flowchart of another multi-SIM call management method according to an embodiment of the present invention.

Before the managed device does not respond to the incoming call event, the managed device further needs to complete the incoming call shielding setting according to the remote management instruction sent by the ES. Therefore, based on the implementation shown in FIG. 4, an implementation shown in FIG. 5 may be further implemented. In FIG. 5, the method further includes steps 301 and 302.

Step 301: The managed device receives a remote management instruction sent by the ES.

Step 302: The managed device determines a communications subunit corresponding to an identifier of a managed profile, and performs an incoming call shielding setting on the communications subunit corresponding to the identifier of the managed profile in response to the remote management instruction.

The performing, by the managed device, an incoming call shielding setting on the communications subunit corresponding to the identifier of the managed profile includes one of the following:

The managed device performs, by using a call screening technology, the incoming call shielding setting on the communications subunit corresponding to the identifier of the managed profile.

In this embodiment of the present invention, screening software used to implement call screening may be installed on the managed device, and an incoming call that needs to be screened is pre-configured in the screening software, to be specific, an incoming call event that points to the managed profile in the managed device is shielded. Alternatively, a function/system service that is used for call screening in a procedure of processing an incoming call event and that is provided in an operating system may be used for implementation, for example, a call screening service provided in an Android system. The communications subunit cannot respond to the incoming call event due to the function. If the managed device receives an incoming call, and the incoming call meets a preset shielding requirement, the managed device shields the incoming call. Certainly, a call screening function may be configured in the managed device, in other words, the managed device shields some or all of incoming calls without installing any screening software.

Alternatively, the managed device sets an empty call answering whitelist for the communications subunit corresponding to the identifier of the managed profile, to shield a call initiated by an MSISDN that is used as a calling number and that does not belong to the call answering whitelist.

The call answering whitelist is used to record the calling number that is allowed to call the user. For example, if a particular user initiates an incoming call to the managed device, and a number used by the particular user to initiate the incoming call is not recorded in the call answering whitelist, the managed device considers that the particular user does not have permission to initiate the call to the managed device, or considers that a user of the managed device does not intend to answer the call from the particular user. If the communications subunit detects that the calling number of the particular user is not in the whitelist, the communications subunit rejects or ignores the incoming call event of the particular user. In view of this, if an empty call answering whitelist is set, it indicates that no call is recorded in the call answering whitelist, in other words, any incoming call cannot be answered by the communications subunit corresponding to the managed profile, or the user of the managed device does not intend to answer a call from any user, to shield the call initiated by the MSISDN that is used as the calling number and that does not belong to the call answering whitelist. For example, if the whitelist includes only the number 186XXXXXXXX a call can be answered only when the number 186XXXXXXXX is used as the calling number, and an incoming call event initiated by another number is directly rejected or ignored. Therefore, setting an empty whitelist for a communications subunit means that calling numbers of all incoming calls that point at the managed profile are not in the whitelist, so that the incoming call shielding is performed on the communications subunit corresponding to the profile.

Alternatively, the managed device adds a designated identifier to the communications subunit corresponding to the identifier of the managed profile, so that after receiving the incoming call event and detecting that the communications subunit has the designated identifier, the communications subunit triggers an incoming call shielding operation on the incoming call event. The designated identifier is used to indicate that the management device has performed the incoming call shielding setting on the communications subunit.

For example, in implementation, a status bit may be added to the communications subunit. When the status bit is set to 0, it indicates that the incoming call shielding setting has been performed on the communications subunit. Therefore, the remote control instruction is used to set, to "0", the status bit of the communications subunit corresponding to the managed profile. When the incoming call points to the managed profile, the communications subunit detects that the status bit of the communications subunit is "0". In this case, the communications subunit does not respond to the incoming call.

In other words, a communications subunit to which the designated identifier is not added still needs to normally perform an incoming call processing process, and the communications subunit to which the designated identifier is added needs to implement the incoming call shielding operation, or does not respond to each incoming call.

In view of this, if the user attempts to shield all incoming calls that need to be processed by the communications subunit corresponding to the identifier of the managed profile, the user needs to perform the shielding setting in advance according to the remote management instruction sent by the ES. The foregoing several enumerated available shielding settings and corresponding shielding operation means are merely used as a possible implementation. This is not limited herein.

Figure 6:
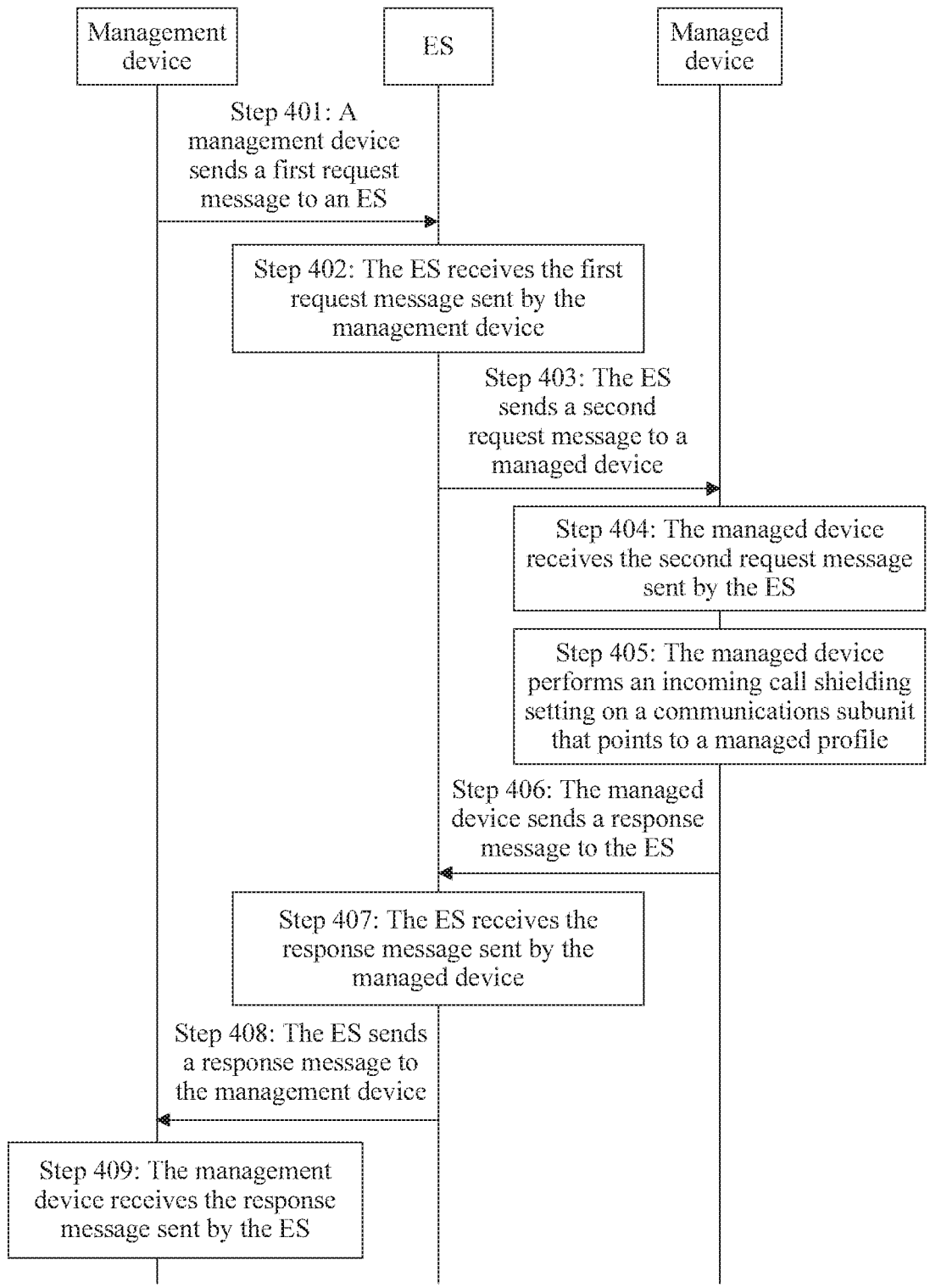
FIG. 6 is an interaction diagram of a multi-SIM call management method according to an embodiment of the present invention.

For example, FIG. 6 shows an implementation process in which a management device initiates an incoming call shielding setting by using an ES. The implementation process includes steps 401 to 409.

Step 401: The management device sends a first request message to the ES.

The first request message is used to instruct the ES to send a second request message to a managed device. The second request message is used to instruct the managed device to perform an incoming call shielding setting on a communications subunit that points to a managed profile, in other words, perform the shielding setting on an incoming call event that points to the managed profile. A designated call includes an incoming call event that uses an MSISDN corresponding to the managed profile as a called subscriber number. The MSISDN is a possible identifier of a management profile. Certainly, the management profile may use other existing or newly-added information as an identifier for distinguishing between different management profiles. This is not limited herein.

The first request message carries at least an identifier of the managed device and a management service identifier, and the management service identifier is used as an identifier of a remote management service during which the shielding setting currently needs to be performed. The second request message carries at least an identifier of the managed profile and a management service identifier, namely, the foregoing remote management instruction.

In this embodiment of the present invention, the first request message may be considered as a management request message initiated by the management device to the ES, and may be sent by a multi-SIM service management module of the management device to the ES, to notify the ES that the management device attempts to adjust a function of the managed device, to be specific, limit implementation of some functions of the managed device.

Step 402: The ES receives the first request message sent by the management device.

After receiving the first request message sent by the management device, the ES attempts to authenticate the management device, determines an identity of the management device, then finds the identifier of the managed profile corresponding to the identifier of the managed device, and then generates the second request message. The second request message carries the found identifier of the managed profile and the management service identifier carried in the first request message.

Step 403: The ES sends a second request message to a managed device.

Step 404: The managed device receives the second request message sent by the ES.

Step 405: The managed device performs an incoming call shielding setting on a communications subunit that points to a managed profile.

The foregoing shielding setting process may include the following steps: The managed device determines, based on the identifier that is of the managed profile and that is in the second request message, the communications subunit corresponding to the identifier of the managed profile, and performs the incoming call shielding setting on the communications subunit. For details, refer to content described in steps 301 and 302.

Step 406: The managed device sends a response message to the ES.

The response message is used to indicate that the managed device has completed the incoming call shielding setting.

Step 407: The ES receives the response message sent by the managed device.

Step 408: The ES sends a response message to the management device.

Step 409: The management device receives the response message sent by the ES.

Figure 7:
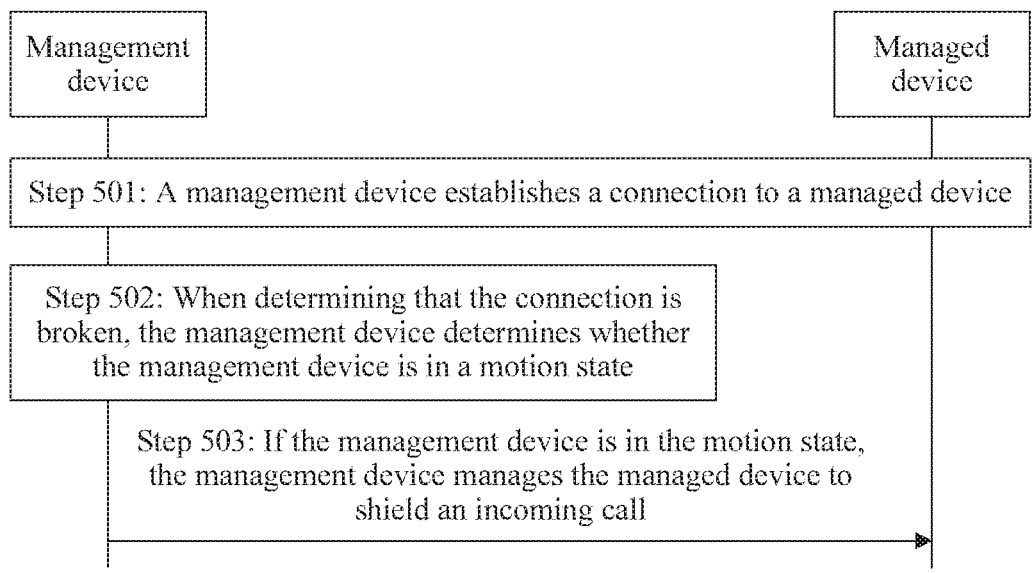
FIG. 7 is an interaction diagram of another multi-SIM call management method according to an embodiment of the present invention.

An embodiment of the present invention provides a multi-SIM call management method. As shown in FIG. 7, the method includes steps 501 to 503. It should be noted that in an initial state, if there is a portable terminal such as a smartphone in at least two associated devices, it may be considered, by default, that the portable terminal serves as a management device, and a device associated with the portable terminal serves as a managed device. In addition to a preset condition, a user may directly set the management device and the managed device in a terminal, or a device may understand, through negotiation or querying, an identity of the device and an identity of another device associated with the device. For a specific implementation process, refer to descriptions in step 204. Details are not described herein again.

Step 501: The management device establishes a connection to the managed device.

The connection may be a connection manner in which a distance between the management device and the managed device is limited, such as a Bluetooth pairing, or may be a connection established by accessing a same wireless network, or the like. This is not limited herein.

Step 502: When determining that the connection is broken, the management device determines whether the management device is in a motion state.

After the management device is connected to the managed device, both the management device and the managed device can sense the corresponding associated devices. Therefore, if the managed device is disconnected from the management device, the management device can identify the disconnection. A manner of determining that the management device is disconnected from the managed device is the prior art. Details are not described herein.

In addition, whether the device is in the motion state may be detected by using various sensors built in the management device. A method for determining whether the device is in the motion state is the prior art. Details are not described herein.

Step 503: If the management device is in the motion state, the management device manages the managed device to shield an incoming call.

For example, the management device is a watch, and the managed device is a mobile phone. When the user wears the watch to take out the trash, the user usually leaves the mobile phone at home due to a relatively short time of going out, so that a connection is broken after the watch serving as the management device is relatively far away from the mobile phone serving as the managed device. When the watch not only detects that the watch is disconnected from the mobile phone, but also detects that the watch is in a motion state, the watch may manage the mobile phone to shield an incoming call. In this way, if there is an incoming call, the user can directly answer the call by using the watch, and the mobile phone at home does not sense the call.

The management device may further determine whether duration of the motion state reaches preset duration. If the management device is in the motion state and the motion state remains for the preset duration, the management device manages the managed device to shield the incoming call.

The preset duration may be preset by the user or a device supplier based on experience. A specific setting manner, the preset duration, and the like are not limited herein.

When the motion state of the management device remains for the preset duration, it may be determined that the management device is currently in use, to trigger a remote management procedure initiated by the management device. For a manner of confirming identities of the management device and the managed device, refer to descriptions in step 204. Details are not described herein again.

The foregoing method in which the management device manages the managed device to shield the incoming call may be the method in steps 401 to 409 in the foregoing embodiment. Details are not described herein again.

In addition, in a scenario in which the management device is reconnected to the managed device, the shielding operation may be automatically terminated by using a corresponding remote management instruction. A manner in which the management device is reconnected to the managed device may include but is not limited to an implementation used to establish a connection between devices, such as Bluetooth.

Figure 8:
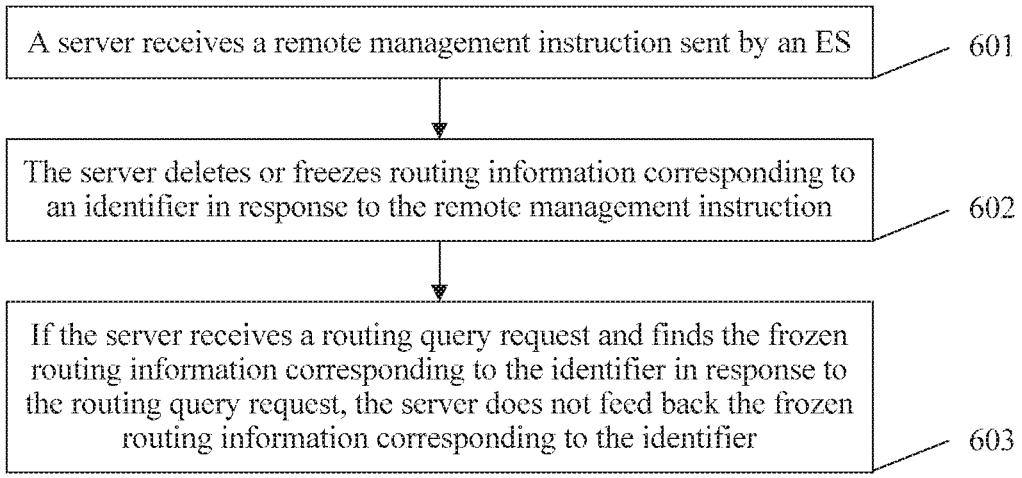
FIG. 8 is a flowchart of another multi-SIM call management method according to an embodiment of the present invention.

An embodiment of the present invention provides a multi-SIM call management method. As shown in FIG. 8, the method includes at least steps 601 and 602. In this embodiment of the present invention, the method may further include step 603.

Step 601: A server receives a remote management instruction sent by an ES.

The remote management instruction includes an identifier of a managed profile in a managed device.

In this embodiment of the present invention, the server may include an HLR or an HSS.

Step 602: The server deletes or freezes routing information corresponding to an identifier in response to the remote management instruction.

In this way, the managed device cannot sense an incoming call, and the call is not answered by mistake.

It should be noted that the frozen routing information corresponding to the identifier may be considered as temporarily frozen routing information, in other words, when a user needs to restore a function of the managed device, the user may unfreeze the previous routing information or restore the frozen routing information.

In addition to the foregoing manner of deleting or freezing the routing information corresponding to the identifier, the server may automatically activate, through subscription in response to the remote management instruction, a supplementary service of call barring for the managed profile in the managed device to implement a shielding setting on an incoming call. For example.

barring of all incoming calls (Barring of All Incoming Calls, BAIC) means that after a user subscribes to this service with an operator, when a person calls the subscriber, the user does not receive any related incoming call notification. In other words, a terminal used by the user can only serve as a calling terminal to initiate a call, but cannot answer a call, or the call can only be made but cannot be answered. Similarly, an SMS message cannot be received, but an SMS message can be sent.

Figure 9:
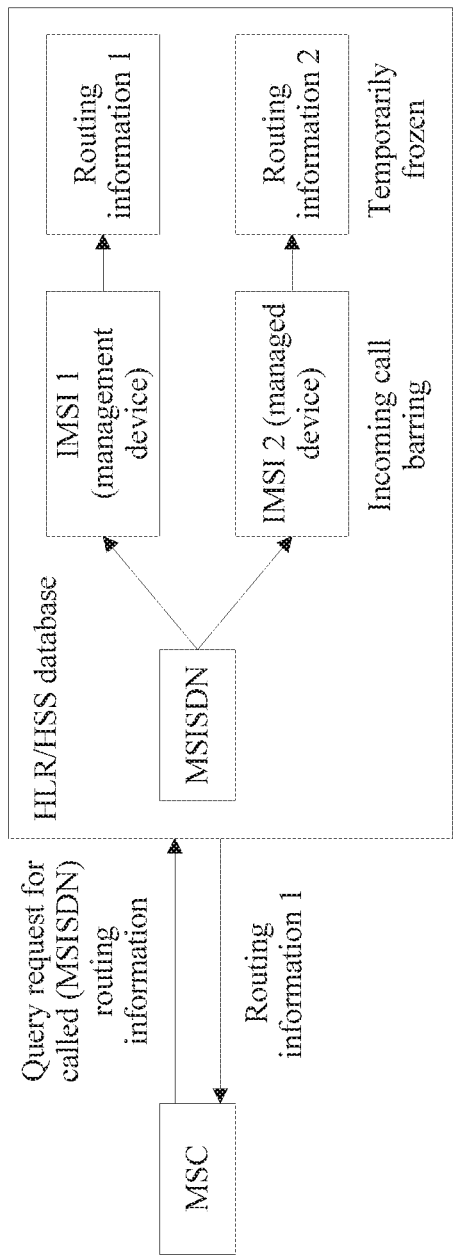
FIG. 9 is a schematic diagram of another process of obtaining routing information by an MSC according to an embodiment of the present invention.

FIG. 9 shows an implementation process in which an MSC obtains routing information after the shielding setting is implemented. The MSC initiates a query request for called routing information to the HLR/HISS, and finds a plurality of pieces of routing information corresponding to an MSISDN from an HLR/HSS database, for example, routing information 1 and routing information 2. However, because an incoming call barring setting is performed on a service data set corresponding to an IMSI 2, and/or the routing information 2 is temporarily frozen, the MSC can obtain only the routing information 1. In other words, only the management device receives an incoming call initiated by a calling terminal, but the managed device cannot receive the call request.

Step 603: If the server receives a routing query request and finds the frozen routing information corresponding to the identifier in response to the routing query request, the server does not feed back the frozen routing information corresponding to the identifier.

The frozen identifier in step 603 is the identifier of the managed profile.

It should be noted that for the deleted routing information, after receiving the routing query request, the server cannot find the deleted routing information, in other words, the server cannot feed back the deleted routing information.

In this embodiment of the present invention, the server may ensure, by temporarily freezing the routing information or by activating a supplementary service of call barring for the managed profile in the managed device, that after a calling terminal initiates a call, the managed device cannot sense the incoming call because the routing information of the managed device is frozen.

Figure 10:
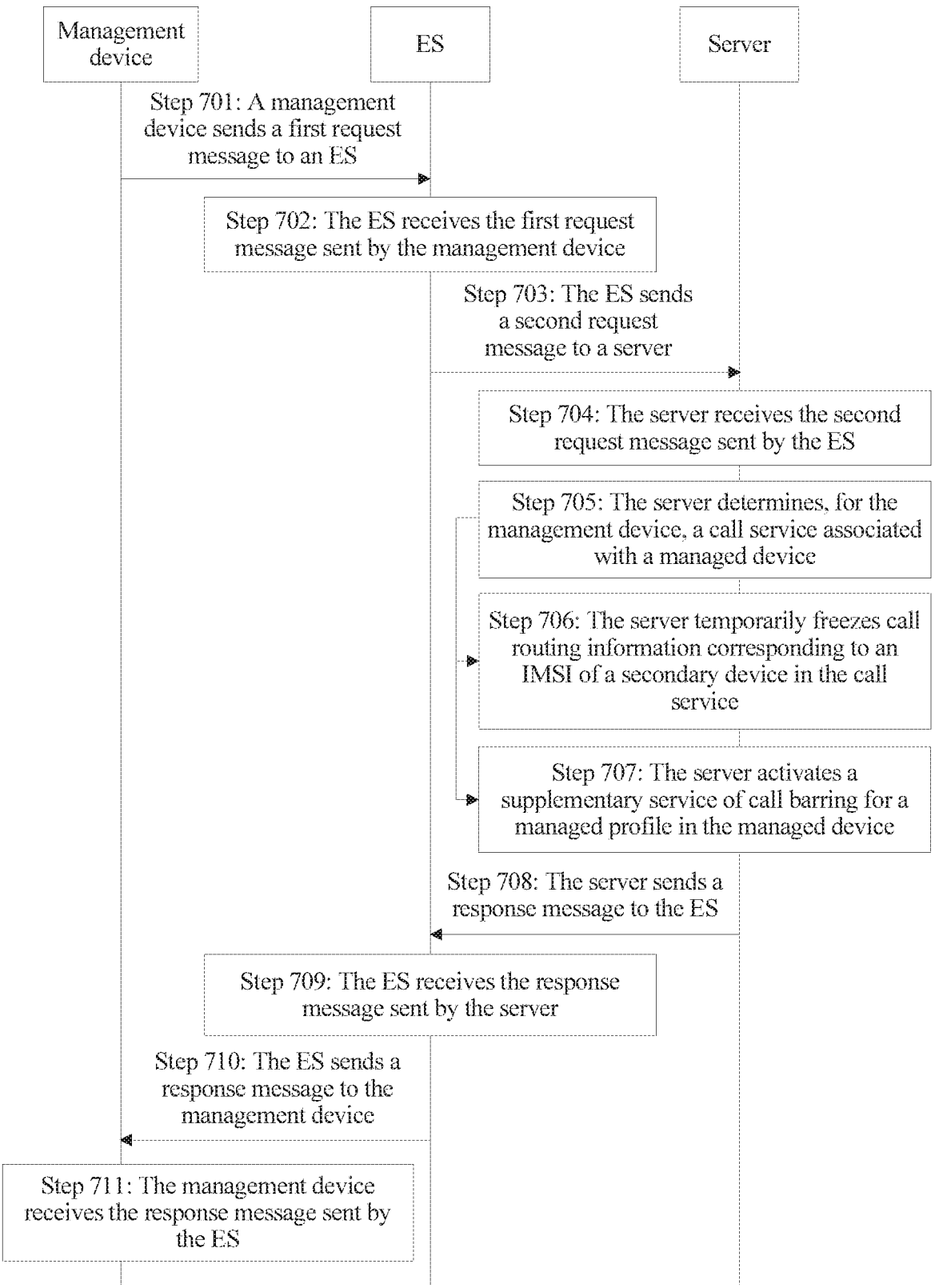
FIG. 10 is an interaction diagram of another multi-SIM call management method according to an embodiment of the present invention.

For example, FIG. 10 shows another implementation in which a management device initiates an incoming call shielding setting by using an ES. The implementation process includes steps 701 to 705. Then, step 707 or 707 is selectively performed based on an actual situation, and finally steps 708 to 711 are performed.

Step 701: The management device sends a first request message to the ES.

The first request message is used to instruct the ES to send a second request message to a server, and the second request message is used to instruct the server to perform a shielding setting on an incoming call that uses a designated call as a called user.

The first request message carries at least an IMSI of the management device, an identifier of a managed device, and a management service identifier, and the second request message carries at least an identifier of the management device, the identifier of the managed device, and the management service identifier.

In this embodiment of the present invention, the first request message may be considered as a management request message initiated by the management device to the ES, and may be sent by a multi-SIM service management module of the management device to the ES, to notify the ES that the management device attempts to adjust a function of the managed device, to be specific, limit implementation of some functions of the managed device.

Step 702: The ES receives the first request message sent by the management device.

After receiving the first request message sent by the management device, the ES determines an identifier of a managed profile in the managed device based on the identifier of the management device and the identifier of the managed device that are in the first request message, and then generates the second request message based on a data format agreed on with the server. The second request message carries the identifier of the management device and the identifier of the managed profile that are obtained by the ES, and further carries the management service identifier carried in the first request message.

Step 703: The ES sends a second request message to a server.

Step 704: The server receives the second request message sent by the ES.

The second request message may be considered as a remote management instruction sent by the ES to the server, and the remote management instruction carries the identifier of the managed profile that needs to be managed. The server performs the shielding setting after receiving the configuration request message.

Step 705: The server determines, for the management device, a call service associated with a managed device.

Step 706 or 707 may be performed after step 705, and then step 708 is performed.

Step 706: The server temporarily freezes call routing information corresponding to an IMSI of a managed profile in the call service.

Step 707: The server activates a supplementary service of call barring for a managed profile in the managed device.

Step 708: The server sends a response message to the ES.

The response message is used to indicate that the server has completed the shielding setting.

Step 709: The ES receives the response message sent by the server.

Step 710: The ES sends a response message to the management device.

Step 711: The management device receives the response message sent by the ES.

Steps 708 to 711 are similar to steps 406 to 409. For details, refer to content described above. The details are not described herein again.

Figure 11:
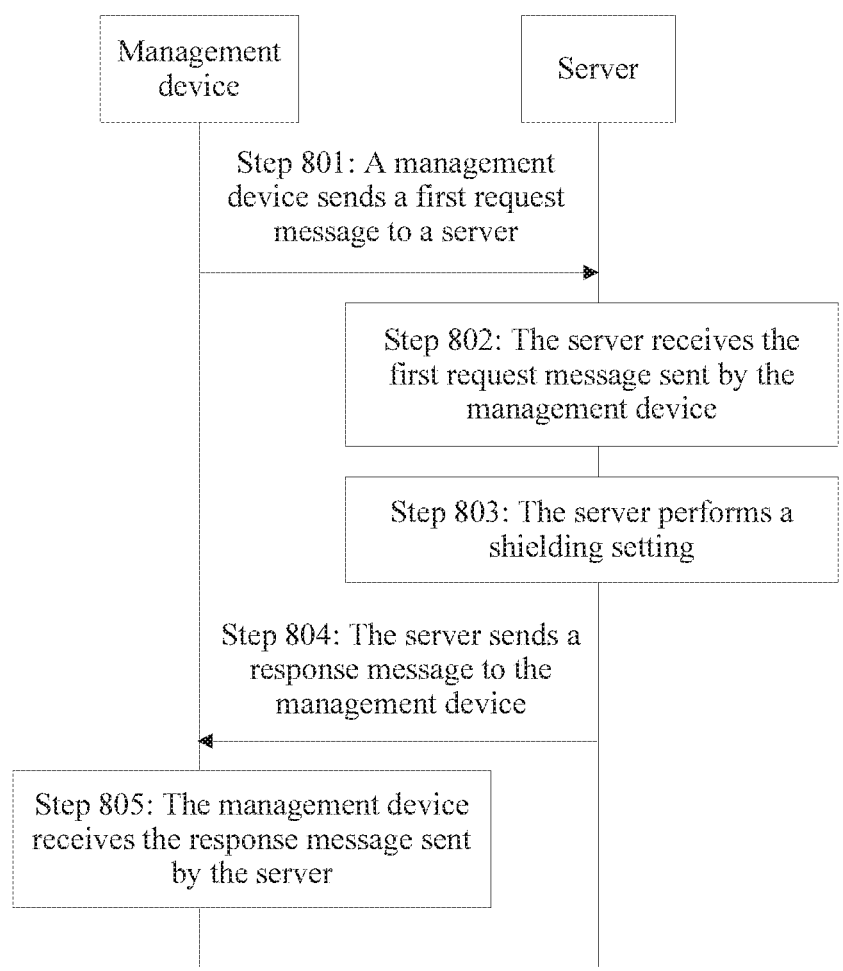
FIG. 11 is an interaction diagram of another multi-SIM call management method according to an embodiment of the present invention.

For another example, a method procedure shown in FIG. 11 is similar to the method procedure shown in FIG. 10, and a difference lies in that an operation procedure is omitted in which the ES, in place of the management device, forwards the message to the server, and then in place of the server, forwards the message to the management device. In other words, the management device interacts with the server by using messages to implement a shielding operation. In FIG. 11, the method procedure includes steps 801 to 805.

Step 801: The management device sends a first request message to the server.

Step 802: The server receives the first request message sent by the management device.

Step 803: The server performs a shielding setting.

It should be noted that for a process in which the server implements the shielding setting, reference may be made to step 706 or 707. Details are not described herein again.

Step 804: The server sends a response message to the management device.

Step 805: The management device receives the response message sent by the server.

Figure 12:
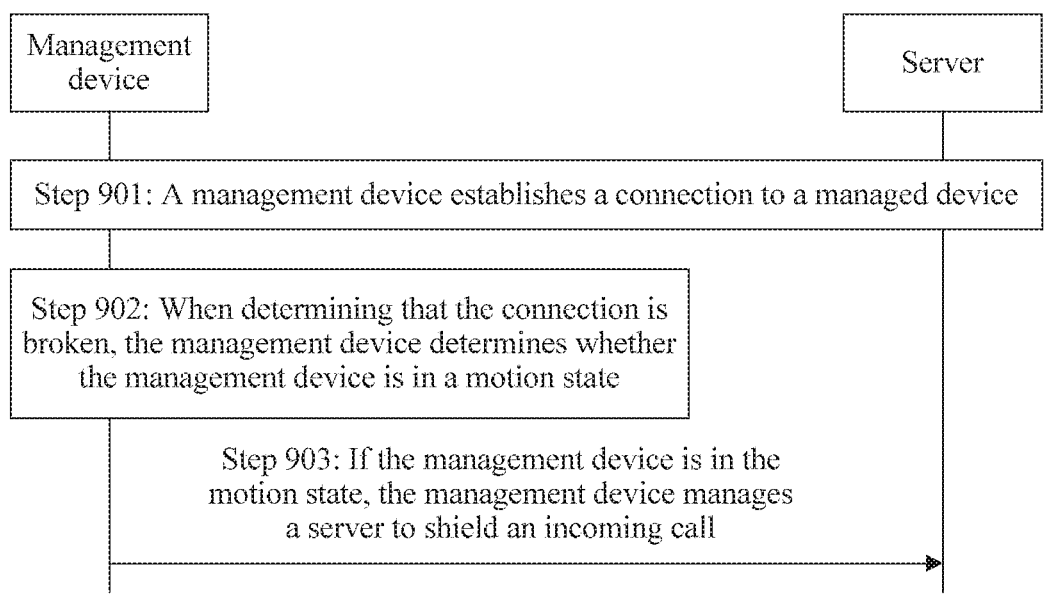
FIG. 12 is an interaction diagram of another multi-SIM call management method according to an embodiment of the present invention.

An embodiment of the present invention provides a multi-SIM call management method. As shown in FIG. 12, the method includes steps 901 to 903. It should be noted that in an initial state, if there is a portable terminal such as a smartphone in at least two associated devices, it may be considered, by default, that the portable terminal serves as a management device, and a device associated with the portable terminal serves as a managed device.

Step 901: The management device establishes a connection to the managed device.

Step 902: When determining that the connection is broken, the management device determines whether the management device is in a motion state.

Step 903: If the management device is in the motion state, the management device manages a server to shield an incoming call.

A method in which the management device manages the server to shield the incoming call may be, for example, the method in steps 701 to 711 in the foregoing embodiment, or the method in steps 801 to 805. Details are not described herein again.

Figure 13:
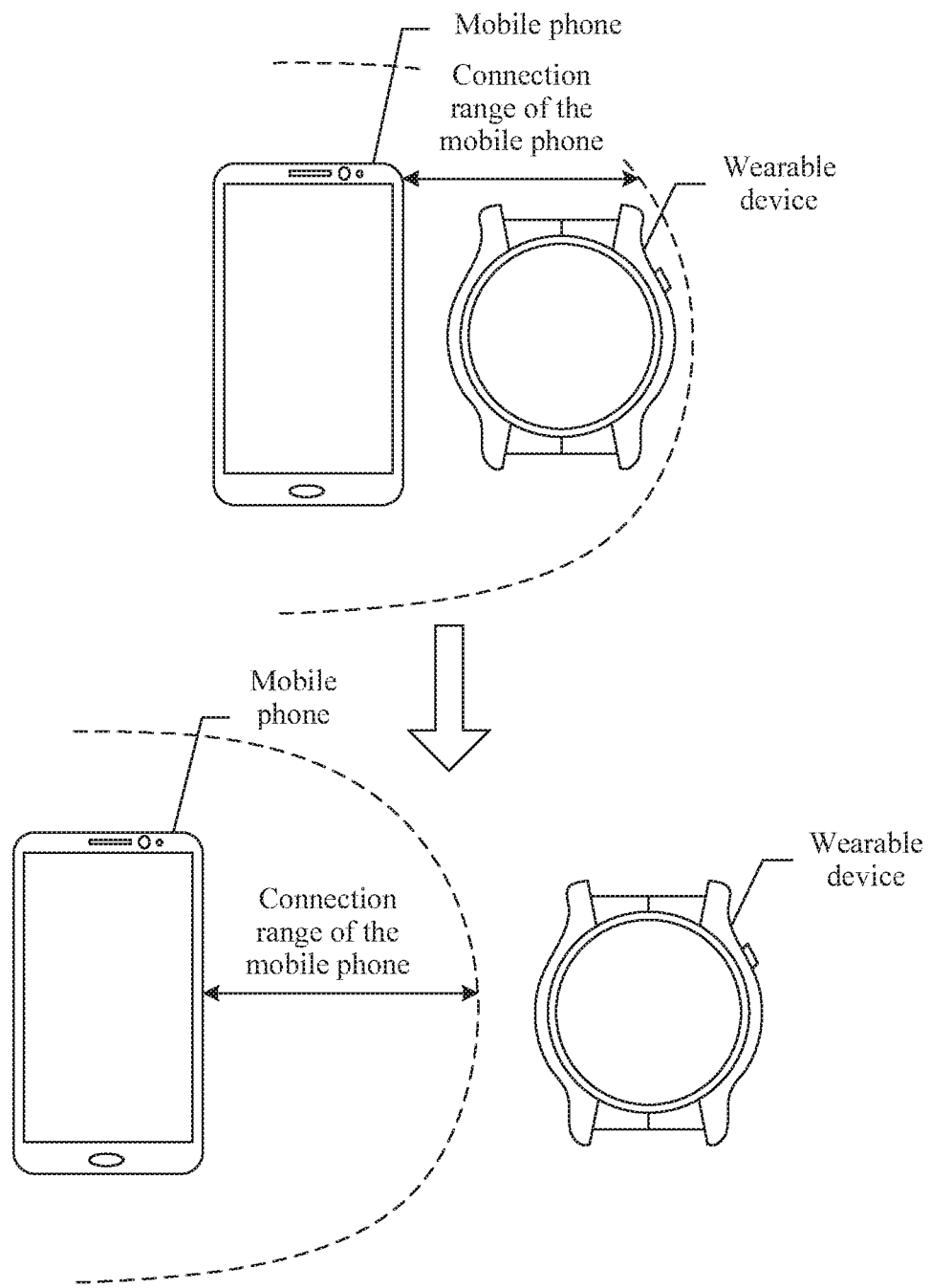
FIG. 13 is a schematic diagram of an application scenario of managing a mobile phone by a wearable device according to an embodiment of the present invention.

FIG. 13 is a schematic diagram of an application scenario in which a wearable device manages a mobile phone. Because the wearable device may be carried by a user, the wearable device has a relatively high call answering priority and serves as a management device. The mobile phone is a managed device. The wearable device may be a device that is easily carried by the user, such as a watch or a wristband. When the wearable device is within a connection range of the mobile phone, it is considered that both the mobile phone and the wearable device are within an operation range of the user. In other words, when there is an incoming call, the user may answer the call by using the mobile phone or the wearable device, and the call is not answered by mistake. In this embodiment of the present invention, after the wearable device is outside the connection range of the mobile phone, because wearing authentication on the wearable device succeeds, the wearable device is a device that meets a preset condition and is considered as the management device. Therefore, after being outside the connection range of the mobile phone, the wearable device triggers a shielding process of an incoming call event of a managed profile, to ensure that after a calling terminal initiates a call, the user may answer the call by using the wearable device that is considered as the management device and that is worn by the user.

It should be noted that if the mobile phone serving as the managed device is in a state in which a call cannot be answered, for example, the mobile phone is disconnected from a network or powered off, there is no need to perform the operation procedure of shielding the incoming call event in this embodiment of the present invention considering that the call cannot be answered by mistake because the currently managed device cannot answer the call. Similarly, if the wearable device serving as the management device is in a state in which a call cannot be answered, for example, the wearable device is disconnected from a network or powered off, there is no need to trigger the operation procedure of shielding the incoming call event considering that the user can answer the call only by using the managed device in this case.

In this embodiment of the present invention, considering that a small quantity of electricity is usually stored in the wearable device, to reduce power consumption of the wearable device, the wearable device can activate an eSIM and be attached to a network only after wearing authentication on the wearable device succeeds, so that the wearable device has a condition that can be used to implement the operation procedure shown in this embodiment of the present invention. A relatively high management priority may be configured for the authenticated wearable device precisely because the wearable device on which the wearing authentication succeeds has a relatively high portability. In other words, the wearable device is the management device, and another device that is associated with the wearable device and on which a multi-SIM service is activated is considered as the managed device.

It should be noted that the user may actively control the mobile phone by using the wearable device, and in addition, after the wearable device is outside the connection range of the mobile phone, the wearable device may prompt, in a manner such as ringing, vibration, or message presentation, the user to trigger the operation procedure of shielding the incoming call in this embodiment of the present invention. The message presentation is used as an example. The following content "A disconnection from the mobile phone is detected, and please determine whether to shield a call from another device" may be presented on a display screen of the wearable device, and the user is prompted to enter an instruction on the wearable device, for example, a button used to represent "Yes" and "No" is set on the wearable device, or a touchable area for the user to select "Yes" and "No" is presented on a touchscreen of the wearable device, or the user is prompted to enter an instruction in a voice manner. This is not enumerated herein.

Figure 14:
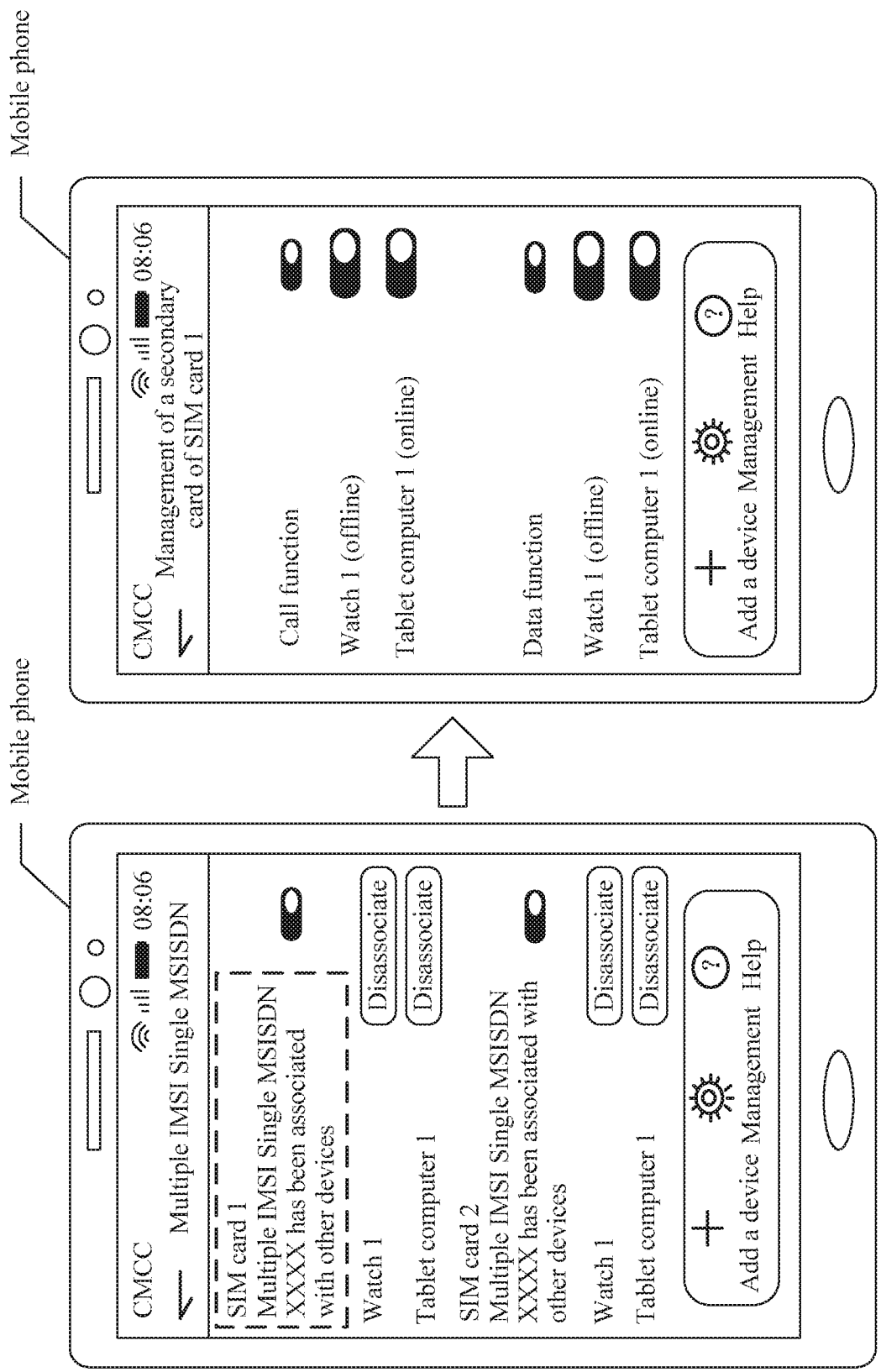
FIG. 14 is a schematic diagram of an application scenario of managing a watch and a tablet computer by a mobile phone according to an embodiment of the present invention.

FIG. 14 is a schematic diagram of an application scenario in which a mobile phone manages a wearable watch and a tablet computer. The mobile phone is a management device, and the watch and the tablet computer are managed devices. In an embodiment of the present invention, a dual-SIM mobile phone is used as an example. Multiple IMSI Single MSISDN information corresponding to two SIM cards (a SIM card 1 and a SIM card 2 in the figure) inserted in the mobile phone is displayed on a management screen of a Multiple IMSI Single MSISDN (namely, a multi-SIM). A user may disassociate, by touching a screen, other devices (namely, the managed devices) associated with the SIM card 1 or 2, for example, a watch 1 and a tablet computer 1.

After the user taps an area circled by dashed-line box shown in FIG. 14, a display screen of the mobile phone switches from the management screen of the Multiple IMSI Single MSISDN to a management screen (namely, another profile that has a Multiple IMSI Single MSISDN relationship with the SIM card 1) of a secondary card of the SIM card 1, and a plurality of function options are provided on the management screen of the secondary card, for example, a call function and a data function. The user can choose, by touching a screen, to enable or disable a corresponding function of a managed device. In this embodiment of the present invention, to facilitate user management, a current state (offline or online) of each managed device may be further displayed on the management screen of the secondary card. It should be noted that FIG. 14 is only a schematic diagram of a possible implementation. A trigger condition of a screen switch, a display manner of management content, a type of a secondary card function, and the like are not limited.

After the managed device is powered on and accesses a network, considering that another user is likely to answer a call by mistake by using the managed device, in other words, the call is answered on the managed device by mistake, after detecting that the managed device is powered on and accesses the network, the management device may prompt, in a manner such as ringing, vibration, or message presentation, the user to trigger the operation procedure of performing remote management by sending the remote management instruction in this embodiment of the present invention. For a specific implementation, refer to the implementation provided in FIG. 13. Details are not described herein again.

In this embodiment of the present invention, if the mobile phone is in an unlocked state, it is considered that the user is operating the mobile phone, to be specific, after a calling terminal initiates a call, the user can directly answer the call by using the mobile phone. Therefore, the mobile phone is preferably set as the management device to be used by the user.

It should be noted that the foregoing examples shown in FIG. 13 and FIG. 14 indicate that from a perspective of the division into the management device and the managed device, the management device is usually a device used by the user to attempt to answer the call. It can be learned from actual use behavior of the user that a descending order of priorities of devices being set as a management device may be: a wearable device on which wearing authentication succeeds and that is outside a connection range of a mobile phone, a mobile phone in an unlocked state, and another device such as a tablet computer or an in-vehicle device. Certainly, a manner of setting the management devices is not limited to the foregoing implementation, and may be further adjusted based on a requirement of the user with reference to an actual use scenario of the user. This is not limited herein.

Embodiments of the present invention provide a multi-SIM call management apparatus, and the apparatus is applied to a managed device. To implement the foregoing functions, the apparatus includes a corresponding hardware structure and/or software module for implementing each function. A person of ordinary skill in the art should easily be aware that, in combination with the examples described in the embodiments disclosed in this specification, units, algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

In the embodiments of the present invention, function module division may be performed on the apparatus based on the foregoing method examples. For example, each function module may be obtained through division based on each corresponding function, or two or more functions may be integrated into one processing module. The integrated module may be implemented in a form of hardware, or may be implemented in a form of a software function module. It should be noted that the module division in the embodiments of the present invention is an example, and is merely logical function division. There may be another division manner in actual implementation.

Figure 15:
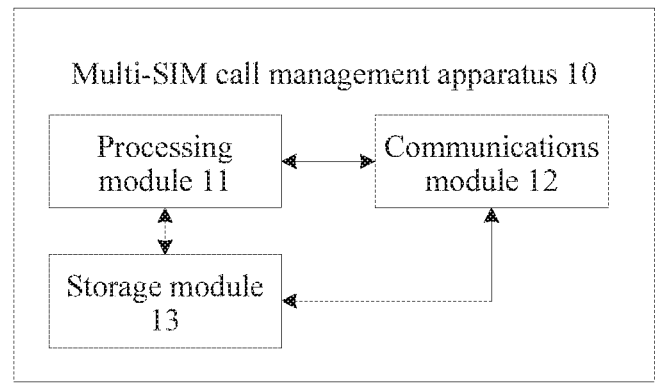
FIG. 15 is a schematic structural diagram of a multi-SIM call management apparatus according to an embodiment of the present invention.

FIG. 15 is a possible schematic structural diagram of the multi-SIM call management apparatus in the foregoing embodiments. A multi-SIM call management apparatus 10 includes a processing module 11 and a communications module 12. In this embodiment of the present invention, the apparatus 10 may further include a storage module 13. The processing module 11 is configured to support the multi-SIM call management apparatus 10 in performing step 201 to step 204 in FIG. 4 and FIG. 5 and step 302 in FIG. 5. The communications module 12 is configured to: support the multi-SIM call management apparatus 10 in performing step 301 in FIG. 5, support data exchange between the modules in the multi-SIM call management apparatus 10, and/or support communication between a management device of the apparatus 10 and another device such as a server. The storage module 13 is configured to store required program code and data.

The processing module 11 may be implemented as a processor or a controller, for example, may be the processor 101 in FIG. 1. The processing module 11 may be a central processing unit (Central Processing Unit, CPU), a general purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a transistor logic device, a hardware component, or any combination thereof. The processing module 11 may implement or execute various example logical blocks, modules, and circuits described with reference to content disclosed in the present invention. Alternatively, the processor may be a combination of processors implementing a computing function, for example, a combination of one or more microprocessors, or a combination of a DSP and a microprocessor. The communications module 12 may be implemented as a transceiver, a transceiver circuit, a communications interface, or the like. The storage module 13 may be implemented as a memory.

Figure 16:
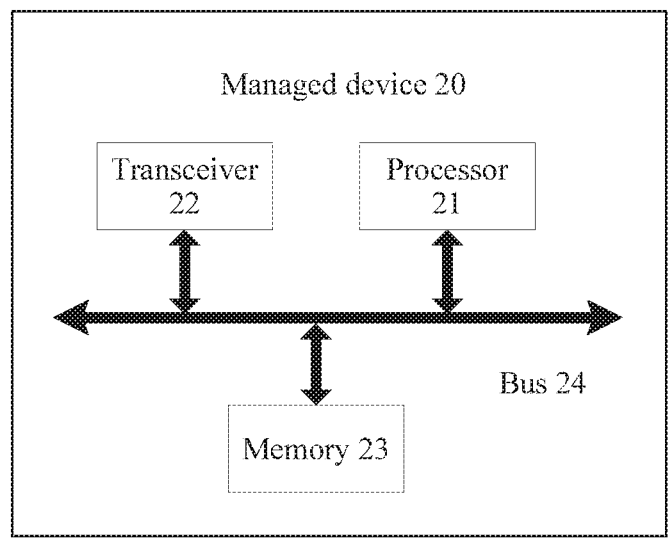
FIG. 16 is a schematic structural diagram of a managed device according to an embodiment of the present invention.

If the processing module 11 is implemented as a processor, the communications module 12 is implemented as a transceiver, and the storage module 13 is implemented as a memory, as shown in FIG. 16, a managed device 20 includes a processor 21, a transceiver 22, a memory 23, and a bus 24. The processor 21, the transceiver 22, and the memory 23 are interconnected by using the bus 24. The bus 24 may be a peripheral component interconnect (Peripheral Component Interconnect, PCI) bus, an extended industry standard architecture (Extended Industry Standard Architecture, EISA) bus, or the like. The bus may be classified into an address bus, a data bus, a control bus, and the like. For ease of representation, only one thick line is used to represent the bus in FIG. 16, but this does not mean that there is only one bus or only one type of bus.

Embodiments of the present invention provide a multi-SIM call management apparatus, and the apparatus is applied to a server. To implement the foregoing functions, the apparatus includes a corresponding hardware structure and/or software module for implementing each function. A person of ordinary skill in the art should easily be aware that, in combination with the examples described in the embodiments disclosed in this specification, units, algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

In the embodiments of the present invention, function module division may be performed on the apparatus based on the foregoing method examples. For example, each function module may be obtained through division based on each corresponding function, or two or more functions may be integrated into one processing module. The integrated module may be implemented in a form of hardware, or may be implemented in a form of a software function module. It should be noted that the module division in the embodiments of the present invention is an example, and is merely logical function division. There may be another division manner in actual implementation.

Figure 17:
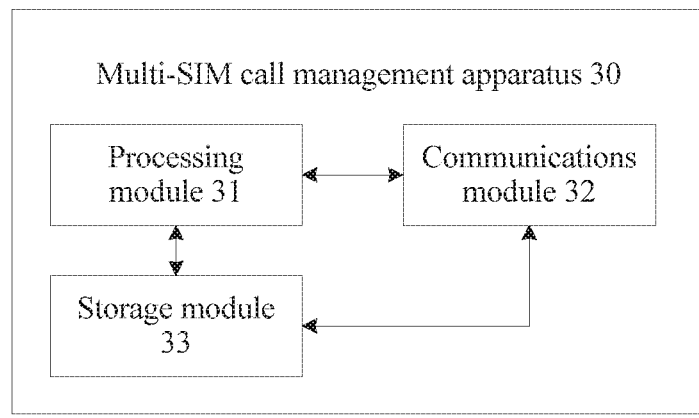
FIG. 17 is a schematic structural diagram of another multi-SIM call management apparatus according to an embodiment of the present invention.

FIG. 17 is a possible schematic structural diagram of the multi-SIM call management apparatus in the foregoing embodiments. A multi-SIM call management apparatus 30 includes a processing module 31 and a communications module 32. In this embodiment of the present invention, the apparatus 30 may further include a storage module 33. The processing module 31 is configured to support the multi- SIM call management apparatus 30 in performing step 602 and step 603 in FIG. 8. The communications module 32 is configured to: support the multi-SIM call management apparatus 30 in performing step 601 in FIG. 8, support data exchange between the modules in the multi-SIM call management apparatus 30, and/or support communication between a management device of the apparatus 30 and another device such as a managed device. The storage module 33 is configured to store required program code and data.

The processing module 31 may be implemented as a processor or a controller, for example, may be a CPU, a general purpose processor, a DSP, an ASIC, an FPGA, or another programmable logic device, a transistor logic device, a hardware component, or any combination thereof. The processing module 31 may implement or execute various example logical blocks, modules, and circuits described with reference to content disclosed in the present invention. Alternatively, the processor may be a combination of processors implementing a computing function, for example, a combination of one or more microprocessors, or a combination of a DSP and a microprocessor. The communications module 32 may be implemented as a transceiver, a transceiver circuit, a communications interface, or the like. The storage module 33 may be implemented as a memory.

Figure 18:
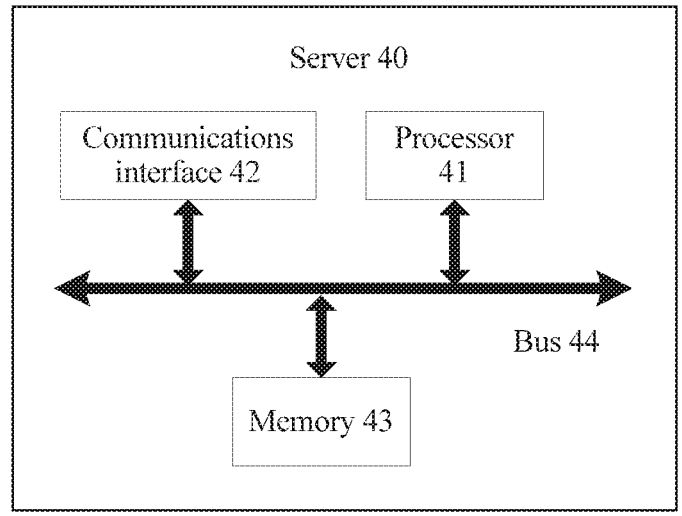
FIG. 18 is a schematic structural diagram of a server according to an embodiment of the present invention.

If the processing module 31 is implemented as a processor, the communications module 32 is implemented as a communications interface, and the storage module 33 is implemented as a memory, as shown in FIG. 18, a server 40 includes a processor 41, a communications interface 42, a memory 43, and a bus 44. The processor 41, the communications interface 42, and the memory 43 are interconnected by using the bus 44. The bus 44 may be a PCI bus, an EISA bus, or the like. The bus may be classified into an address bus, a data bus, a control bus, and the like. For ease of representation, only one thick line is used to represent the bus in FIG. 18, but this does not mean that there is only one bus or only one type of bus.

Figure 19:
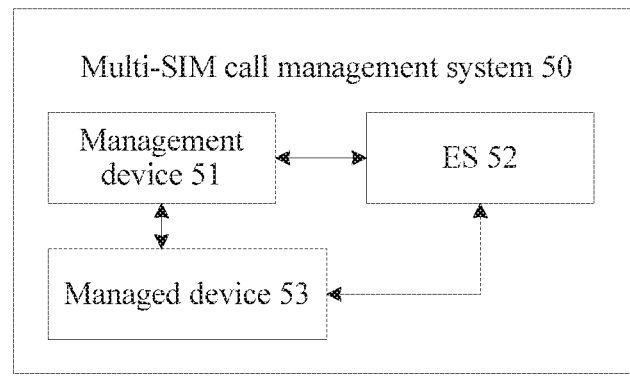
FIG. 19 is a schematic structural diagram of a multi-SIM call management system according to an embodiment of the present invention.

An embodiment of the present invention provides a multi-SIM call management system 50. As shown in FIG. 19, the system 50 includes a management device 51, an ES 52, and a managed device 53.

The management device 51 sends a remote management instruction to the managed device 53 by using the ES 52. The remote management instruction includes an identifier of a managed profile in the managed device.

The managed device 51 receives the remote management instruction, determines a communications subunit corresponding to the identifier of the managed profile, and performs an incoming call shielding setting on the communications subunit corresponding to the identifier of the managed profile in response to the remote management instruction.

The managed device 53 parses an incoming call to obtain call information. The call information includes a called identifier.

If the managed device 53 has performed an incoming call shielding setting on a communications subunit corresponding to the called identifier, the managed device 53 does not respond to an incoming call event.

In a possible implementation, the management device 51 parses the incoming call to obtain the call information. If the management device 51 has not performed the incoming call shielding setting on the communications subunit corresponding to the called identifier, the management device 51 responds to the incoming call event.

Figure 20:
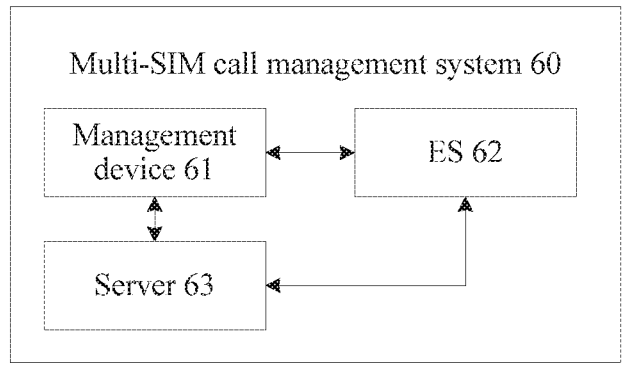
FIG. 20 is a schematic structural diagram of another multi-SIM call management system according to an embodiment of the present invention.

An embodiment of the present invention provides a multi-SIM call management system 60. As shown in FIG. 20, the system 60 includes a management device 61, an ES 62, and a server 63.

The management device 61 sends a remote management instruction to the server 63 by using the ES 62. The remote management instruction includes an identifier of a managed profile in a managed device.

The server 63 receives the remote management instruction, and deletes or freezes routing information corresponding to the identifier, so that a communications subunit corresponding to the identifier in the managed device cannot respond to an incoming call event.

In a possible implementation, the management device 61 parses an incoming call to obtain call information. The call information includes a called identifier. If the management device 61 has not performed an incoming call shielding setting on a communications subunit corresponding to the called identifier, the management device 61 responds to an incoming call event.

It should be noted that in this embodiment of the present invention, the management device 61 may manage the managed device on the server 63 by using the ES 62, or may directly communicate with the server 63 without using the ES 62, in other words, directly manage the managed device on the server 63.

An embodiment of the present invention provides a computer program product, the computer program product includes software code, and the software code is used to execute the method procedure shown in FIG. 4 or FIG. 5.

An embodiment of the present invention provides a computer program product, the computer program product includes software code, and the software code is used to execute the method procedure shown in FIG. 8.

An embodiment of the present invention provides a computer storage medium, including an instruction. When the instruction runs on an electronic device, the electronic device is enabled to execute the method procedure shown in FIG. 4 or FIG. 5.

An embodiment of the present invention provides a computer storage medium, including an instruction. When the instruction runs on an electronic device, the electronic device is enabled to execute the method procedure shown in FIG. 8.

A person skilled in the art should be aware that in the foregoing one or more examples, functions described in the embodiments of the present invention may be implemented by hardware, software, firmware, or any combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and beneficial effects of the embodiments of the present invention are further described in detail in the foregoing specific implementations. It should be understood that the foregoing descriptions are merely specific implementations of the present invention, but are not intended to limit the protection scope of the present invention. Any modification, equivalent replacement, or improvement made based on the technical solutions in the embodiments of the present invention shall fall within the protection scope of the embodiments of the present invention.

What is claimed is:

1. A multi-subscriber identity module (SIM) call management method implemented by a managed device, the multi-SIM call management method comprising:
   parsing an incoming call to obtain call information that comprises a called identifier;
   determining a first communications circuit that corresponds to the called identifier and that is configured to implement, on the managed device, a communication function that corresponds to a profile and that comprises answering an incoming call that points to the profile; and
   skipping responding to an incoming call event when the managed device has performed an incoming call shielding setting on the first communications circuit in response to a remote management instruction from an entitlement server (ES),
   wherein the remote management instruction comprises an identifier of a managed profile in the managed device.

2. The multi-SIM call management method of claim 1, wherein before skipping responding to the incoming call event, the multi-SIM call management method further comprises:
   receiving the remote management instruction from the ES;
   determining a second communications circuit corresponding to the identifier of the managed profile; and
   performing an incoming call shielding setting on the second communications circuit in response to the remote management instruction.

3. The multi-SIM call management method of claim 2, wherein performing the incoming call shielding setting on the second communications circuit comprises performing, using a call screening technology, the incoming call shielding setting on the second communications circuit.

4. The multi-SIM call management method of claim 2, further comprising setting an empty call answering whitelist for the second communications circuit to shield a call initiated by a mobile station international integrated services digital network (ISDN) number (MSISDN) that is used as a calling number and that does not belong to the empty call answering whitelist.

5. The multi-SIM call management method of claim 2, further comprising:
   adding a designated identifier to the second communications circuit; and
   triggering, by the second communications circuit after detecting that the second communications circuit has the designated identifier, an incoming call shielding operation on the incoming call event, wherein the designated identifier indicates that the managed device has performed the incoming call shielding setting on the second communications circuit.

6. The multi-SIM call management method of claim 1, further comprising rejecting the incoming call event.

7. The multi-SIM call management method of claim 1, wherein the called identifier comprises a temporary mobile subscriber identity (TMSI).

8. The multi-SIM call management method of claim 1, wherein after determining the first communications circuit, the multi-SIM call management method further comprises:
   identifying whether the incoming call shielding setting has been performed on the first communications circuit; and
   prompting a user to respond to the incoming call event when the incoming call shielding setting has not been performed on the first communications circuit.

9. The multi-SIM call management method of claim 1, further comprising ignoring the incoming call event.

10. The multi-SIM call management method of claim 1, wherein the called identifier comprises an international mobile subscriber identity (IMSI).

11. The multi-SIM call management method of claim 1, wherein the called identifier comprises a mobile station international integrated services digital network (ISDN) number (MSISDN).

12. The multi-SIM call management method of claim 1, further comprising determining whether the called identifier matches the identifier of the managed profile.

13. The multi-SIM call management method of claim 1, further comprising skipping responding to the incoming call when both the called identifier matches the identifier of the managed profile and the managed device has performed an incoming call shielding setting on the first communications circuit in response to the remote management instruction from the ES.

14. A multi-subscriber identity module (SIM) call management method, comprising:
   sending, by a management device, a remote management instruction to a managed device using an entitlement server (ES), wherein the remote management instruction comprises an identifier of a managed profile in the managed device;
   receiving, by the managed device, the remote management instruction;
   determining, by the managed device, a communications circuit corresponding to the identifier of the managed profile;
   performing, by the managed device, an incoming call shielding setting on the communications circuit in response to the remote management instruction;
   parsing, by the managed device, an incoming call to obtain call information that comprises a called identifier; and
   skipping, by the managed device, responding to an incoming call event when the managed device has performed the incoming call shielding setting on the communications circuit.

15. The multi-SIM call management method of claim 14, further comprising:
   parsing, by the management device, the incoming call to obtain the call information;
   identifying, by the management device, whether the management device has performed the incoming call shielding setting on the communications circuit corresponding to the called identifier; and
   responding, by the management device, to the incoming call event when the management device has not performed the incoming call shielding setting on the communications circuit.

16. A multi-subscriber identity module (SIM) managed device, comprising:
   a processor; and
   memory coupled to the processor and storing instructions that, when executed by the processor, cause the multi-SIM managed device to:
   parse an incoming call to obtain call information that comprises a called identifier;
   determine a first communications circuit that corresponds to the called identifier and that is configured to implement, on the managed device, a communication function that corresponds to a profile and that comprises answering an incoming call that points to the profile; and skip responding to an incoming call event when the managed device has performed an incoming call shielding setting on the first communications circuit in response to a remote management instruction from an entitlement server (ES), wherein the remote management instruction comprises an identifier of a managed profile in the managed device.

17. The multi-SIM managed device of claim 16, wherein before skipping responding to the incoming call event, the instructions further cause the multi-SIM managed device to:
receive the remote management instruction from the ES;
determine a second communications circuit corresponding to the identifier of the managed profile; and
perform an incoming call shielding setting on the second communications circuit in response to the remote management instruction.

18. The multi-SIM managed device of claim 16, wherein the instructions further cause the multi-SIM managed device to reject the incoming call event.

19. The multi-SIM managed device of claim 16, wherein the called identifier comprises a temporary mobile subscriber identity (TMSI).

20. The multi-SIM managed device of claim 19, wherein the instructions further cause the multi-SIM managed device to:
determine whether the called identifier matches the identifier of the managed profile; and
skip responding to the incoming call in response to the called identifier matching the identifier of the managed profile and the managed device having performed the incoming call shielding setting on the first communications circuit in response to the remote management instruction from the ES.

* * * * *